(12) United States Patent
Oshima

(10) Patent No.: US 12,246,373 B2
(45) Date of Patent: Mar. 11, 2025

(54) WIRE STRAIGHTENING DEVICE, WIRE PROCESSING DEVICE HAVING THE SAME, AND WIRE STRAIGHTENING METHOD

(71) Applicant: Shinmaywa Industries, Ltd., Takarazuka (JP)

(72) Inventor: Takashi Oshima, Takarazuka (JP)

(73) Assignee: Shinmaywa Industries, Ltd., Hyogo (JP)

( * ) Notice: Subject to any disclaimer, the term of this patent is extended or adjusted under 35 U.S.C. 154(b) by 373 days.

(21) Appl. No.: 17/764,573

(22) PCT Filed: Oct. 11, 2019

(86) PCT No.: PCT/JP2019/040293
§ 371 (c)(1),
(2) Date: Jul. 27, 2022

(87) PCT Pub. No.: WO2021/070376
PCT Pub. Date: Apr. 15, 2021

(65) Prior Publication Data
US 2022/0410249 A1    Dec. 29, 2022

(51) Int. Cl.
*B21F 1/02* (2006.01)
*B21D 3/02* (2006.01)
(Continued)

(52) U.S. Cl.
CPC ............... *B21F 1/02* (2013.01); *B21D 3/02* (2013.01); *H01R 43/05* (2013.01); *H02G 1/1248* (2013.01)

(58) Field of Classification Search
CPC .. B21F 1/02; B21D 3/02; B21B 37/58; B21B 37/60
See application file for complete search history.

(56) References Cited

U.S. PATENT DOCUMENTS 4,355,526 A   10/1982  Miles
7,958,762 B1   6/2011  Wolf
(Continued)

FOREIGN PATENT DOCUMENTS

CN    102366803 A    3/2012
EP    0 459 869 A1   12/1991
(Continued)

OTHER PUBLICATIONS

Machine Translation of WO 2021/024363 (Year: 2021).*
(Continued)

*Primary Examiner* — Debra M Sullivan
(74) *Attorney, Agent, or Firm* — Keating & Bennett, LLP

(57) ABSTRACT

An object is to provide a wire straightening device and a wire straightening method, with which it is possible to automatically set the roller spacing in accordance with the type of the wire and to further adjust the roller spacing during operation. A wire straightening device (20) includes a preset value obtaining device that obtains a preset value of roller spacing, which is predetermined for each type of wire (2); a roller spacing automatic setting device that drives an actuator (26a) so that the roller spacing becomes equal to the preset value when the type of the wire (2) is input; and a roller spacing changing device that changes the roller spacing based on an operation by the operator while retaining the preset value during operation of a wire processing device (1).

12 Claims, 14 Drawing Sheets

(51) Int. Cl.
    *H01R 43/05*     (2006.01)
    *H02G 1/12*     (2006.01)

(56)     References Cited

U.S. PATENT DOCUMENTS

| | | | |
|---|---|---|---|
| 8,978,435 B2 * | 3/2015 | Viviroli | B21F 1/02 |
| | | | 140/147 |
| 2011/0315266 A1 | 12/2011 | Viviroli | |
| 2017/0173652 A1 | 6/2017 | Viviroli | |

FOREIGN PATENT DOCUMENTS

| | | |
|---|---|---|
| EP | 0 636 433 A1 | 2/1995 |
| EP | 2 399 856 A1 | 12/2011 |
| JP | 58-189036 U | 12/1983 |
| JP | 04-319035 A | 11/1992 |
| JP | 2002-066678 A | 3/2002 |
| JP | 2009-172642 A | 8/2009 |
| JP | 2017-113805 A | 6/2017 |
| JP | 2019-154107 A | 9/2019 |
| WO | WO-2021024363 A1 * | 2/2021 ................ B21F 1/02 |

OTHER PUBLICATIONS

Official Communication issued in Chinese Patent Application No. 201980100851.4 mailed on Oct. 19, 2023.
Official Communication issued in corresponding European Patent Application No. 19948429.6, mailed on Oct. 7, 2022.
Official Communication issued in International Patent Application No. PCT/JP2019/040293, mailed on Dec. 17, 2019.

\* cited by examiner

WIRE STRAIGHTENING DEVICE, WIRE PROCESSING DEVICE HAVING THE SAME, AND WIRE STRAIGHTENING METHOD

TECHNICAL FIELD

The present invention relates to a wire straightening device, a wire processing device having the same, and a wire straightening method.

BACKGROUND ART

There are conventional wire processing devices known in the art that dispense a wire from a reel and perform processes such as cutting the wire and crimping terminals onto the wire. While a wire wound on a reel is curled, such processes cannot be performed well if the wire remains curled. Therefore, a wire straightening device is often used to straighten the curl of the wire dispensed from the reel.

Conventional wire straightening devices with a plurality of upper rollers and a plurality of lower rollers are known in the art. The wire is conveyed while being sandwiched between the upper rollers and the lower rollers, whereby the curl is straightened under the pressing force from these rollers.

Here, if the pressing force is not of an appropriate magnitude, it is not possible to straighten the curl. While the amount of pressing force received by the wire is determined by the spacing between the upper rollers and the lower rollers (hereinafter referred to as the roller spacing), the pressing force varies for different outer diameters wires with the roller spacing being equal. There is a desirable roller spacing for each of different wires of different outer diameters.

Patent Document 1 discloses a wire straightening device capable of automatically setting the roller spacing in accordance with the wire type. With this wire straightening device, the roller spacing is changed by changing the vertical position of the upper support that supports the upper rollers. This wire straightening device includes a servo motor that raises and lowers the upper support and a memory that stores target positions of the upper support that are set for different types of wires. When the operator specifies a wire type, the controller drives the servo motor to automatically move the upper support to the target position. Thus, the roller spacing is set automatically in accordance with the wire type.

Patent Document 1 further states that the target position can be changed as necessary by the operator operating the control section. Therefore, if the pressing force is inappropriate, the target position can be changed before the operation of the device, and then the operation can be started.

CITATION LIST

Patent Literature

[Patent Document No. 1] Japanese Laid-Open Patent Publication No. 2009-172642

SUMMARY OF INVENTION

Problems to be Solved by the Invention

Now, when a wire is dispensed from a reel, first, a portion wound on an outer portion of the reel is dispensed, and then a portion wound on an inner portion of the reel is dispensed. However, the portion wound on the inner portion and the portion wound on the outer portion have different degrees of curl. The portion wound on the inner portion of the reel has a greater curl than the portion wound on the outer portion, and should therefore be straightened with a greater. Thus, for the same wire type, the desirable roller spacing does not remain constant, but gradually changes during operation of the device.

For the same degree of curl, the hardness of the wire varies depending on environmental conditions such as temperature and humidity. Therefore, for the same wire type and for the same degree of curl, the magnitude of the pressing force that should be applied changes slightly as the environmental conditions change. Accordingly, the desirable roller spacing changes slightly.

With the straightening device and the straightening method disclosed in Patent Document 1, when a wire type is specified, the roller spacing is automatically set to a value (preset value) that is predetermined for each wire type or to a value (changed preset value) that is obtained by changing the predetermined value, but the roller spacing remains constant during operation of the device. Therefore, even if the roller spacing is desirable immediately after the start of operation of the device, as the operation progresses, the roller spacing may become inappropriate and the effect of straightening may decrease. In order to restore the straightening effect (in other words, achieve the appropriate roller spacing), it is necessary to once stop the operation of the device and adjust the preset value. However, since the wire processing device is a device that processes a wire continuously at high speed, even a brief stoppage can significantly reduce productivity.

The present invention has been made in view of such a problem, and it is an object of a present invention to provide a wire straightening device, a wire processing device and a wire straightening method, with which it is possible to automatically set the roller spacing in accordance with the wire type and to further adjust the roller spacing during operation.

Solution to the Problems

A wire straightening device according to the present invention is a wire straightening device, included in a wire processing device, for straightening a curl of a wire that is fed onto a straight feed path. The wire straightening device includes: a plurality of first straightening rollers arranged along the feed path; a plurality of second straightening rollers arranged along the feed path and arranged on an opposite side of the feed path from the first straightening rollers; a first support member that supports the first straightening rollers; a second support member that supports the second straightening rollers; an actuator that moves the first support member in a direction such that the first straightening rollers move closer to the second straightening rollers and in a direction such that the first straightening rollers move away from the second straightening roller; a preset value obtaining device that obtains a preset value of roller spacing, representing spacing between the first straightening rollers and the second straightening rollers, which is predetermined for each type of wire; a roller spacing automatic setting device that drives the actuator so that the roller spacing becomes equal to the preset value in accordance with the type of the wire, when the type of the wire is input; and a roller spacing changing device that changes the roller spacing based on an operation by an operator while retaining the preset value during operation of the wire processing device.

According to the wire straightening device described above, when the type of the wire is input, the roller spacing automatic setting device drives the actuator so that the roller spacing is automatically set to the preset value, which is predetermined in accordance with the type of the wire. In addition, since the wire straightening device described above includes the roller spacing changing device, the operator can change the roller spacing while seeing the condition of the wire during operation of the wire processing device. Therefore, it is possible to adjust the roller spacing during operation of the wire processing device and improve the precision of straightening. Note that since the preset value of roller spacing itself is not changed but is retained, the roller spacing can be again set automatically to the original preset value before the start of the next operation of the wire processing device, for example.

According to a preferred embodiment of the present invention, the roller spacing changing device includes a computer including a correction value setting section that sets a correction value of the roller spacing based on an operation by the operator, and a drive control section that drives the actuator so that the roller spacing becomes equal to a value that is obtained by adding the correction value to the preset value.

According to the embodiment described above, it is possible to adjust the roller spacing by the actuator that moves the first support member so that the roller spacing becomes equal to the preset value. There is no need to separately provide an actuator for setting the roller spacing to the preset value and an actuator for adjusting the roller spacing.

According to a preferred embodiment of the present invention, the wire processing device includes a feeding device that repeats an operation of feeding the wire onto the feed path and an operation of stopping the feed. The roller spacing changing device is configured to drive the actuator so that the roller spacing becomes equal to a value that is obtained by adding the correction value to the preset value while the feeding device stops feeding the wire.

According to the embodiment described above, since the roller spacing is adjusted while the wire is stopped, it is possible to stably adjust the roller spacing.

According to a preferred embodiment of the present invention, the roller spacing changing device includes: another actuator that moves the second support member in a direction such that the second straightening rollers move closer to the first straightening rollers and in a direction such that the second straightening rollers move away from the first straightening rollers; and a computer. The computer includes a correction value setting section that sets a correction value of the roller spacing based on an operation by the operator, and a drive control section that drives the other actuator so that the roller spacing becomes equal to a value that is obtained by adding the correction value to the preset value.

According to the embodiment described above, the adjustment of the roller spacing is done by another actuator separate from the actuator for setting the roller spacing to the preset value. Therefore, the roller spacing can be adjusted without being influenced by the actuator for setting the roller spacing to the preset value.

According to a preferred embodiment of the present invention, the wire processing device includes a feeding device that repeats an operation of feeding the wire onto the feed path and an operation of stopping the feed. The roller spacing changing device is configured to drive the other actuator so that the roller spacing becomes equal to a value that is obtained by adding the correction value to the preset value while the feeding device stops feeding the wire.

According to the embodiment described above, since the roller spacing is adjusted while the wire is stopped, it is possible to stably adjust the roller spacing.

Now, since the correction value is a value that is set as necessary in accordance with the condition of the wire during an iteration of the operation, it is not necessarily preferred to make the same correction during another iteration of the operation. In view of this, the correction value setting section of the roller spacing changing device may be configured to delete the set correction value after the operation of the wire processing device ends or before start of a next operation.

On the other hand, for example, after the operation of the wire processing device is once ended, the operation may be resumed in some cases without changing the type of the wire. In such a case, the correction value setting section of the roller spacing changing device may be configured to retain the set correction value even when the operation of the wire processing device ends.

According to a preferred embodiment of the present invention, the wire straightening device includes a display device that displays the preset value and the correction value.

According to the embodiment described above, the operator can easily grasp the preset value and the correction value. Therefore, it is possible to easily adjust the roller spacing.

According to a preferred embodiment of the present invention, the roller spacing changing device includes a change input device configured so that the change input device can be operated by the operator during operation of the wire processing device so as to input a change to the roller spacing.

According to the embodiment described above, the operator can easily adjust the roller spacing by operating the change input device while seeing the condition of the wire.

According to a preferred embodiment of the present invention, the wire straightening device includes an indicator that displays a degree of the correction value during operation of the wire processing device.

According to the embodiment described above, the operator can easily adjust the roller spacing by performing an operation while seeing the condition of the wire and the indicator.

According to a preferred embodiment of the present invention, the roller spacing changing device includes a moving mechanism that moves, by a manual operation by the operator, the second support member in a direction such that the second straightening rollers move closer to the first straightening rollers and in a direction such that the second straightening rollers move away from the first straightening rollers.

According to the embodiment described above, the roller spacing can be adjusted while retaining the preset value based on a manual operation by the operator.

A wire processing device according to the present invention includes: a feeding device that repeats an operation of feeding the wire onto the feed path and an operation of stopping the feed; a wire straightening device that straightens a curl of the wire that is fed onto the feed path; and a processing mechanism that performs at least one of cutting the wire that has been straightened by the wire straightening device, stripping off a coating material of the wire, and crimping a terminal onto the wire. The wire straightening device includes: a plurality of first straightening rollers arranged along the feed path; a plurality of second straightening rollers arranged along the feed path and arranged on an opposite side of the feed path from the first straightening rollers; a first support member that supports the first straightening rollers; a second support member that supports the second straightening rollers; an actuator that moves the first support member in a direction such that the first straightening rollers move closer to the second straightening rollers and in a direction such that the first straightening rollers move away from the second straightening roller; a preset value obtaining device that obtains a preset value of roller spacing, representing spacing between the first straightening rollers and the second straightening rollers, which is predetermined for each type of wire; a roller spacing automatic setting device that drives the actuator so that the roller spacing becomes equal to the preset value in accordance with the type of the wire, when the type of the wire is input; and a roller spacing changing device that changes the roller spacing based on an operation by an operator while retaining the preset value during operation of the wire processing device.

A wire straightening method according to the present invention is a wire straightening method for straightening a wire by a wire straightening device provided in a wire processing device, the wire straightening device including: a plurality of first straightening rollers arranged along the feed path; a plurality of second straightening rollers arranged along the feed path and arranged on an opposite side of the feed path from the first straightening rollers; a first support member that supports the first straightening rollers; a second support member that supports the second straightening rollers; an actuator that moves the first support member in a direction such that the first straightening rollers move closer to the second straightening rollers and in a direction such that the first straightening rollers move away from the second straightening roller; and a preset value obtaining device that obtains a preset value of roller spacing, representing spacing between the first straightening rollers and the second straightening rollers, which is predetermined for each type of wire, the method including: driving the actuator so that the roller spacing becomes equal to a preset value obtained by the preset value obtaining device in accordance with a type of the wire before start of operation of the wire processing device; and changing the roller spacing while retaining the preset value during operation of the wire processing device.

According to the wire straightening method described above, by driving the actuator before the start of operation of the wire processing device, it is possible to automatically set the roller spacing so as to be equal to the preset value, which is predetermined in accordance with the type of the wire. In addition, the operator adjusts the roller spacing while seeing the condition of the wire during operation of the wire processing device. Therefore, the roller spacing can be fine-tuned based on the degree of the curl of the wire, and it is possible to improve the precision of straightening. Note that the preset value of roller spacing itself is not changed but is retained. Therefore, the roller spacing can be set automatically to the original preset value at the start of the next operation of the wire processing device, for example.

Advantageous Effects of the Invention

According to the present invention, it is possible to automatically set the roller spacing in accordance with the wire type and to further adjust the roller spacing during operation.

DESCRIPTION OF EMBODIMENTS

First Embodiment

Figure 1:
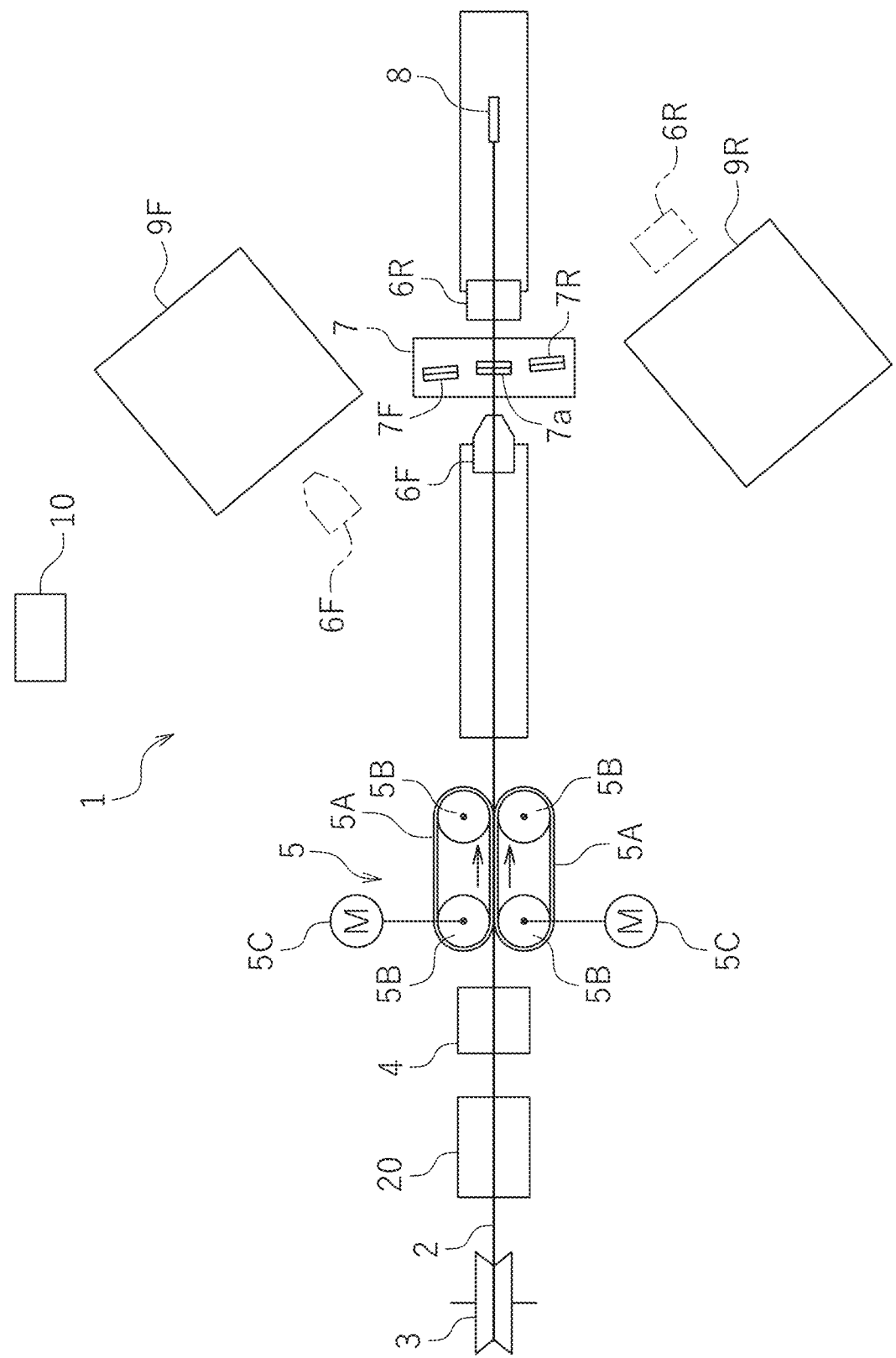
FIG. 1 is a schematic plan view showing a configuration of a wire processing device.

An embodiment of the present invention will now be described with reference to the drawings. FIG. 1 is a schematic plan view showing a configuration of a wire processing device 1 including a wire straightening device 20 according to the present embodiment.

The wire processing device 1 includes a reel 3 around which a wire 2 is wound, the wire straightening device 20 that straightens the curl of the wire 2, a length measuring section 4 that measures the amount of feed (the length of feed) of the wire 2, a feeding device 5 that feeds the wire 2, a clamp 6F that clamps a front end portion of the wire 2 fed by the feeding device 5, a terminal crimper 9F that crimps a terminal 8 at the front end portion of the wire 2 clamped by the clamp 6F, a cutter device 7, a clamp 6R that clamps a rear end portion of the wire 2 downstream of the cutter device 7, and a terminal crimper 9R that crimps the terminal 8 at the rear end portion of the wire 2 clamped by the clamp 6R.

Although not shown in the figures, the wire 2 is a so-called covered wire, which includes a core wire and a coating material surrounding the core wire. The core wire is made of a conductor such as a metal, and the coating material is made of an insulator such as a resin.

The cutter device 7 has a cutting blade 7a that cuts the wire 2, a strip blade 7F for stripping off the coating material at the front end portion of the wire 2 clamped by the clamp 6F, and a strip blade 7R that strips off the coating material at the rear end portion of the wire 2 clamped by the clamp 6R.

The feeding device 5 is a device that feeds the wire 2 in the longitudinal direction of the wire 2. There is no particular limitation on the configuration of the feeding device 5. In the present embodiment, the feeding device 5 includes left and right conveyor belts 5A that sandwich the wire 2 therebetween, a pair of pulleys 5B between which each conveyor belt 5A is wound, and a conveyor motor 5C linked to at least one pulley 5B. When the conveyor motor 5C is driven, a pulley 5B linked to the conveyor motor 5C is rotated, and the left and right conveyor belts 5A circulate as shown by arrows in the figure. Therefore, the wire 2 sandwiched by the left and right conveyor belts 5A is fed out forward (rightward in FIG. 1). As will be described in detail later, during operation of the wire processing device 1, the feeding device 5 repeats the operation of feeding the wire 2 and the operation of stopping the wire 2. Note that in the present embodiment, the wire 2 is dispensed from the reel 3 as the feeding device 5 feeds the wire 2 forward. Note however that it is possible to separately provide another motor, or the like, that rotates the reel 3 so as to feed the wire 2.

The wire processing device 1 includes a control device 10 for controlling the operation of the feeding device 5, the wire straightening device 20, the cutter device 7, the terminal crimpers 9F and 9R, etc. The control device 10 is a computer including a CPU, a ROM, a RAM, etc. The control device 10 may be a dedicated computer for the wire processing device 1 or may be a general-purpose computer (e.g., a personal computer).

Next, the wire straightening device 20 will be described with reference to FIG. 2.

The wire straightening device 20 is a device that straightens the curl of the wire 2 fed onto a straight feed path 2A. The wire straightening device 20 includes a plurality of cylindrical guide members 42 arranged along the feed path 2A so that the wire 2 can be easily guided onto the feed path 2A.

The wire straightening device 20 includes a plurality of first straightening rollers 25 and a plurality of second straightening rollers 23 arranged along the feed path 2A. One or both of the first straightening rollers 25 and the second straightening rollers 23 may be arranged parallel to the feed path 2A or may be arranged non-parallel to the feed path 2A. For example, one or both of the first straightening rollers 25 and the second straightening rollers 23 may be arranged so that the further downstream (rightward in FIG. 2), the farther away they are from the delivery path 2A. The wire straightening device 20 includes a first support member 24 supporting the first straightening rollers 25 and a second support member 22 supporting the second straightening rollers 23. The second straightening rollers 23 are arranged on the opposite side of the first straightening rollers 25 with respect to the feed path 2A. Here, the first straightening rollers 25 are arranged on the upper side of the feed path 2A and the second straightening rollers 23 are arranged on the lower side of the feed path 2A. Note however that the arrangement is not limited to this arranged as long as the first straightening rollers 25 and the second straightening rollers 23 are arranged on opposite sides from each other with the feed path 2A therebetween. Other arrangements may be possible, for example, the first straightening rollers 25 may be arranged on the lower side of the feed path 2A and the second straightening rollers 23 may be arranged on the upper side of the feed path 2A. The first straightening rollers 25 may be arranged on the left side of the feed path 2A and the second straightening rollers 23 may be arranged on the right side of the feed path 2A.

The wire straightening device 20 includes a lift mechanism 26 that raises and lowers the first support members 24. The lift mechanism 26 includes a motor 26a and a ball screw 26b. Here, the motor 26a is a servo motor. The upper end portion of the ball screw 26b is linked to the motor 26a, and a lower end portion of the ball screw 26b is engaged with a female thread portion (not shown) of the first support member 24. When the motor 26a is driven, the ball screw 26b rotates and the first support member 24 rises or lowers. When the first support member 24 lowers, the first straightening rollers 25 move closer to the second straightening rollers 23. When the first support member 24 rises, the first straightening rollers 25 move away from the second straightening rollers 23. The motor 26a is an example of an actuator for moving the first support member 24 in a direction such that the first straightening rollers 25 move closer to the second straightening rollers 23 and in a direction such that the first straightening rollers 25 move away from the second straightening rollers 23. Note however that such an actuator is not limited to the motor 26a. The actuator may be an actuator of any other type such as an air cylinder.

When the first support member 24 is raised or lowered, the vertical spacing between the first straightening rollers 25 and the second straightening rollers 23 (hereinafter referred to as the roller spacing) changes. In the present embodiment, the roller spacing is defined by the distance rd in the vertical direction between the center of the first straightening rollers 25 and the center of the second straightening rollers 23. Note however that there is no particular limitation on the definition of the roller spacing as long as it is a parameter that uniquely specifies the vertical positional relationship between the first straightening rollers 25 and the second straightening rollers 23.

The wire straightening device 20 includes a roller spacing measuring section 27 that measures the roller spacing. The roller spacing measuring section 27 includes a sensor body 27b, and a detection pin 27a protruding downward from the sensor body 27b. The detection pin 27a is displaceable with respect to the sensor body 27b and is in contact with the first support member 24. When the first support member 24 is raised, the detection pin 27a is pushed upward by the first support member 24, thereby reducing the length of protrusion of the detection pin 27a from the sensor body 27b. Conversely, when the first support member 24 is lowered, the length of protrusion of the detection pin 27a from the sensor body 27b increases. Therefore, by detecting the amount of displacement of the detection pin 27a, it is possible to identify the position of the first support member 24 and to measure the roller spacing. In the present embodiment, a Hall IC linear displacement sensor (not shown) is provided inside the sensor body 27b. The Hall IC linear displacement sensor detects the amount of displacement of the detection pin 27a, thereby measuring the roller spacing.

The wire straightening device 20 also includes an outer diameter measuring section 40 that measures the outer diameter of the wire 2 (see reference sign D in the figure). The outer diameter measuring section 40 includes a fixed roller 43, a movable roller 44 that is movable in the vertical direction, and a displacement sensor 46 that detects the position of the movable roller 44 in the vertical position. The wire 2 is sandwiched between the fixed roller 43 and the movable roller 44. The movable roller 44 is displaceable in the vertical direction inside a long hole 45 and is biased toward the fixed roller 43 by a spring (not shown). The position of the movable roller 44 in the vertical direction is displaced according to the outer diameter of the wire 2. Therefore, the displacement sensor 46 detects the position of the movable roller 44 in the vertical direction to measure the outer diameter of the wire 2.

Figure 3:
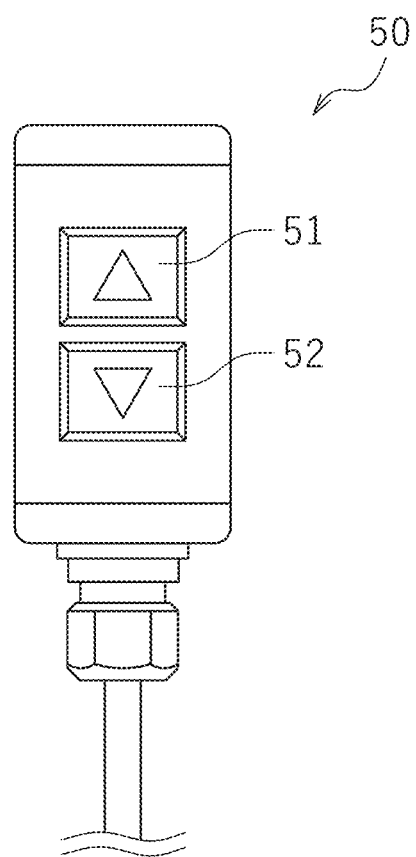
FIG. 3 is a front view showing a change input device.

As shown in FIG. 3, the wire straightening device 20 includes a change input device 50 that is operated by an operator. The change input device 50 is a device that is operated by the operator to change the roller spacing during operation of the wire processing device 1. In the present embodiment, the change input device 50 includes an up button 51 that is pressed to increase the roller spacing and a down button 52 that is pressed to decrease the roller spacing. Note however that the change input device 50 described herein is merely an example. The change input device 50 is a device that can be used to input an instruction to increase the roller spacing and an instruction to decrease the roller spacing, and there is no limitation on the configuration thereof. The change input device 50 is not limited to a button-type input device, but may also be a dial-type input device, a touch panel-type input device, or any other type of an input device.

Figure 4:
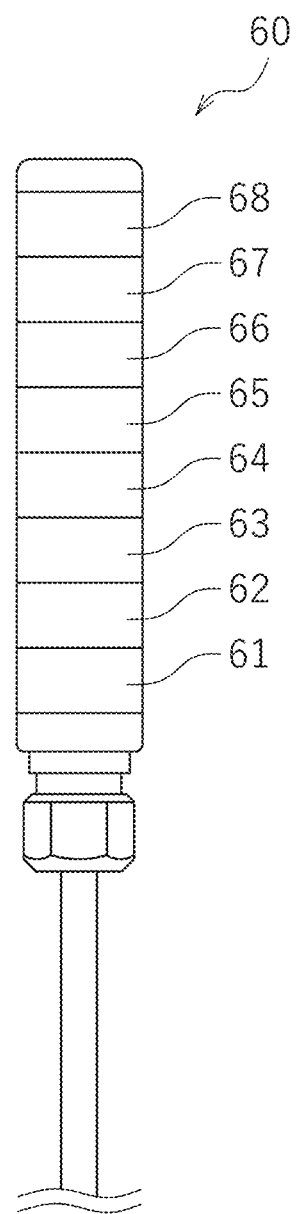
FIG. 4 is a front view showing an indicator.

As shown in FIG. 4, the wire straightening device 20 includes an indicator 60 that displays the degree of the change in roller spacing. In the present embodiment, the indicator 60 includes eight vertically-aligned lamps 61 to 68. These eight lamps 61 to 68 display the amount of change in eight levels. Here, the larger the roller spacing, the greater the number of lamps that are lit. When the amount of change is zero, the lamps 61 to 64 in the lower half are lit, and the lamps 65 to 68 in the upper half are turned off. When the amount of change decreases below zero (i.e., a negative amount of change), the lamps 61 to 64 are turned off gradually one by one in the following order: 64, 63, 62, 61. Conversely, when the amount of change increases above zero, the lamps 65 to 68 are lit gradually one by one in the following order: 65, 66, 67, 68. Note however that the indicator 60 described herein is merely an example. There is no limitation on the configuration thereof as long as the indicator 60 can display the degree of the amount of change in roller spacing. The indicator 60 may be a meter-type indicator, an image display device, or any other form of an indicator.

Figure 5:
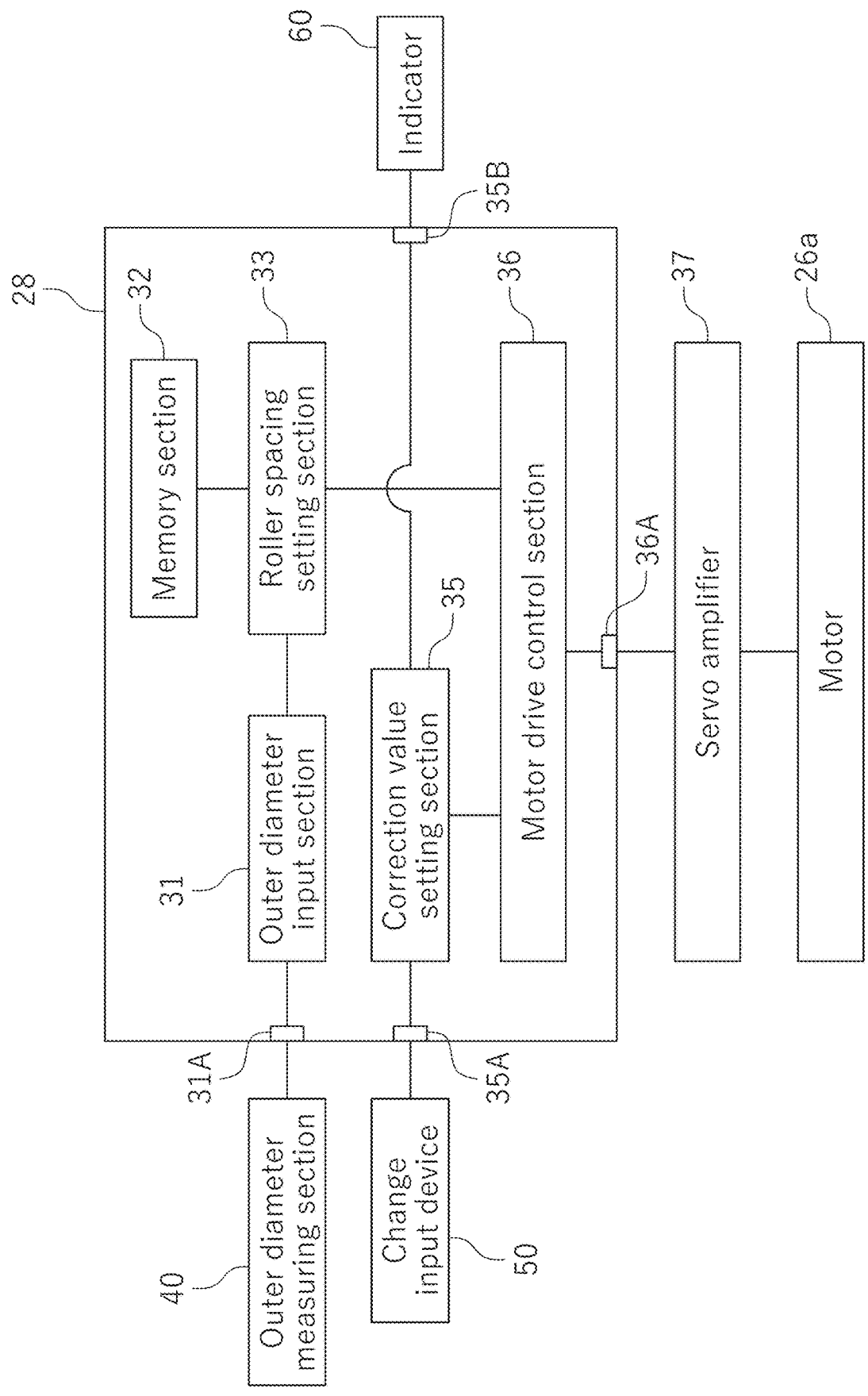
FIG. 5 is a block diagram showing a controller, etc., of the wire straightening device according to the first embodiment.

FIG. 5 is a block diagram showing a controller 28 and units that are connected to controller 28. The controller 28 is composed of a computer including a CPU, a ROM, a RAM, etc. Note that while the controller 28 of the wire straightening device 20 may be configured separately from the control device 10 of the wire processing device 1, the control device 10 of the wire processing device 1 may serve also as the controller 28 of the wire straightening device 20. As shown in FIG. 5, the controller 28 includes an input port 31A connected to the outer diameter measuring section 40 (specifically, the displacement sensor 46 of the outer diameter measuring section 40), an outer diameter input section 31 that receives information of the outer diameter of the wire 2 from the outer diameter measuring section 40, a memory section 32, a roller spacing setting section 33, an input port 35A connected to the change input device 50, a correction value setting section 35 that receives information of the amount of change in roller spacing from the change input device 50, a motor drive control section 36, an output port 36A connected to a servo amplifier 37, and an output port 35B connected to the indicator 60.

Figure 6:
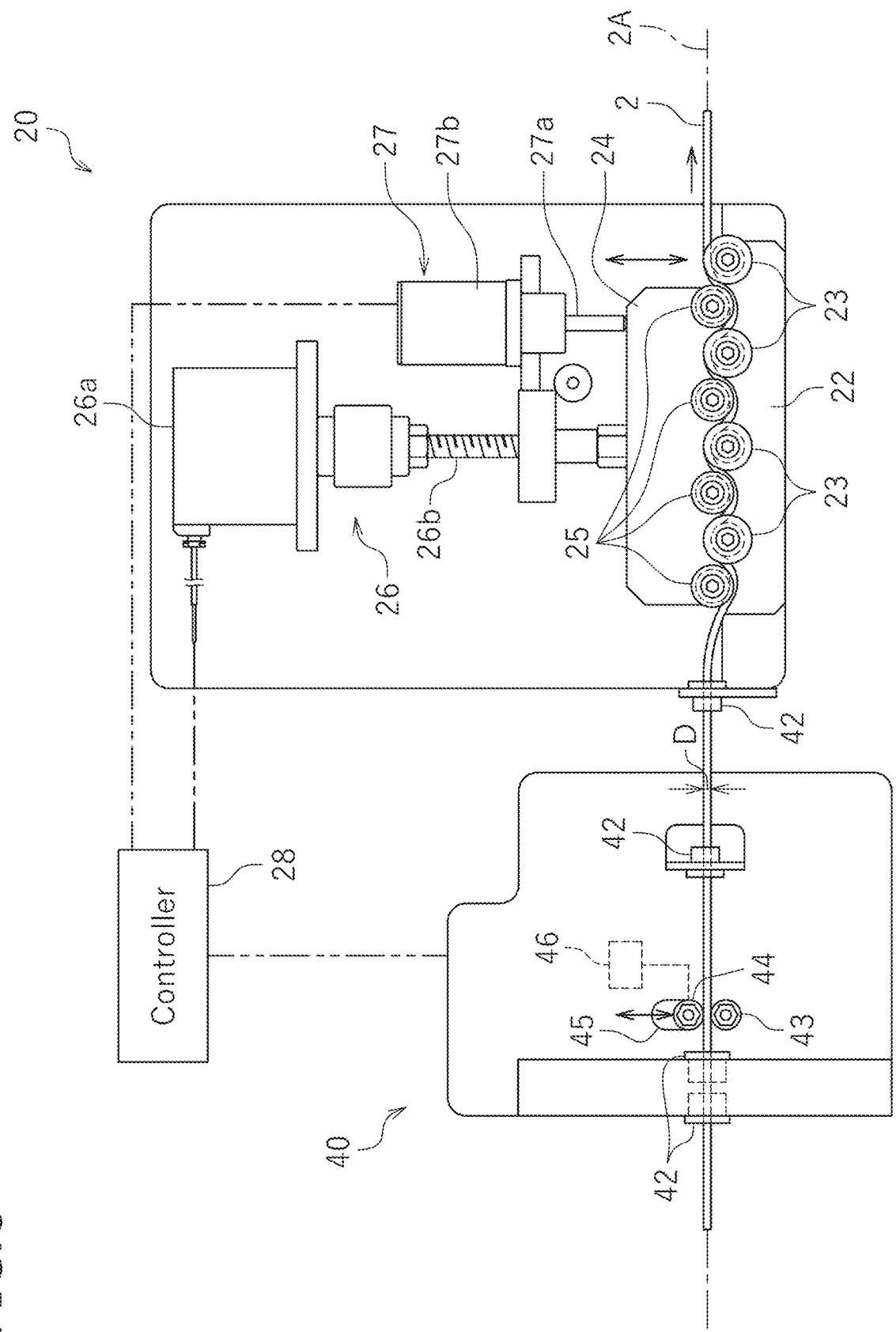
FIG. 6 is a side view showing the wire straightening device while straightening a wire.

As shown in FIG. 6, the wire straightening device 20 sandwiches the wire 2 by the first straightening rollers 25 and the second straightening rollers 23 to give an appropriate pressing force on the wire 2, thereby straightening the curl. Here, the pressing force to be given to the wire 2 is determined based on the roller spacing. On the other hand, the pressing force to be given to the wire 2 varies if the outer diameter of the wire 2 is different even if the roller spacing is the same. That is, even if the roller spacing is the same, the pressing force decreases if the outer diameter of the wire 2 is smaller, and the pressing force increases if the outer diameter of the wire 2 is larger. Therefore, the roller spacing with which the pressing force is desirable differs for each outer diameter of the wire 2. The desirable roller spacing can be determined for each outer diameter of the wire 2 by conducting preliminary tests or based on past experience. The memory section 32 stores the predetermined relationship between outer diameters of the wire and desirable roller spacings. In the present embodiment, the memory section 32 forms a "preset value obtaining device" for obtaining a predetermined preset value of the roller spacing for each type of wire.

The roller spacing setting section 33 drives the motor 26*a* so that a desirable roller spacing is achieved in accordance with the outer diameter of the wire 2. When the outer diameter measuring section 40 measures the outer diameter of the wire 2, the information of the outer diameter of the wire 2 is input to the outer diameter input section 31. When the roller spacing setting section 33 obtains the information of the outer diameter of the wire 2 from the outer diameter input section 31, the roller spacing setting section 33 reads out, from the memory section 32, the preset value of desirable roller spacing in accordance with the outer diameter. Then, the roller spacing setting section 33 sends a command to the motor drive control section 36 so that the roller spacing becomes equal to the preset value. Then, the motor drive control section 36 controls the motor 26*a* through the servo amplifier 37 so that the roller spacing becomes equal to the preset value. Note that the preset values are retained without being overwritten during operation of the wire processing device 1. In the present embodiment, the preset values stored in memory section 32 cannot be erased or changed. Note however that there is no particular limitation on this configuration. The preset values stored in memory section 32 may be erasable or changeable. Note that in the present embodiment, the roller spacing setting section 33 and the motor drive control section 36 form a "roller spacing automatic setting device" that drives the motor 26*a* so that the roller spacing becomes equal to the preset values.

Information of the amount of change in roller spacing input to the change input device 50 is input to the correction value setting section 35. For example, if the operator presses the up button 51 of the change input device 50 once, a command to increase the roller spacing by one step is input to the correction value setting section 35. Conversely, if the operator presses the down button 52 of the change input device 50 once, a command to narrow the roller spacing by one step is input to the correction value setting section 35. The correction amount of the roller spacing when the up button 51 and the down button 52 are pressed once is set in advance. For example, when the up button 51 is pressed once, the roller spacing is set to increase by 0.05 mm, and when the down button 52 is pressed once, the roller spacing is set to decrease by 0.05 mm The correction value setting section 35 sets the correction value of the roller spacing based on the number of times the up button 51 and the down button 52 are pressed. Then, the correction value setting section 35 sends the set correction value to the motor drive control section 36. Upon receiving the correction value, the motor drive control section 36 controls the motor 26*a* to change the roller spacing by an amount that corresponds to the correction value. Note that when the correction value is set by the correction value setting section 35, information of the correction value is sent to the indicator 60, and the indicator 60 turns on or turns off the lamps 61 to 68 in accordance with the amount of change in roller spacing. In the present embodiment, the correction value setting section 35, the motor drive control section 36 and the motor 26a together form a "roller spacing change device".

Although there is no particular limitation on the degree of the difference between the preset value of the roller spacing and the correction value, for example, the correction value may be −50% to +50%, −30% to +30%, −20% to +20%, −10% to +10%, or −5% to +5 of the preset value.

The wire straightening device 20 is configured as described above. Next, the operation of the wire processing device 1 will be described. The wire processing device 1 continuously produces the wire 2 of a predetermined length with terminals 8 crimped at opposite ends by repeating one cycle of operation as described below.

One cycle of operation begins with the terminal 8 crimped on the front end portion of the wire 2 and the front end portion of the wire 2 being positioned rearward (leftward in FIG. 1) of the cutting blade 7a of the cutter device 7. From this state, first, the feeding device 5 feeds the wire 2 forward (rightward in FIG. 1) by a predetermined length. Accordingly, the wire 2 is dispensed from the reel 3. The wire 2 passes between the first straightening rollers 25 and the second straightening rollers 23 of the wire straightening device 20 and receives a pressing force from the first straightening rollers 25 and the second straightening rollers 23, thereby straightening the curl (see FIG. 6).

When the wire 2 is fed forward by a predetermined length, the feeding device 5 stops feeding the wire 2. When the feeding of the wire 2 is stopped, the clamp 6F and the clamp 6R clamp the wire 2, and the cutting blade 7a of the cutter device 7 cuts the wire 2. As a result, the wire 2 is cut into a rear wire 2 clamped by the clamp 6F and a front wire 2 clamped by the clamp 6R.

Next, the clamp 6F swivels leftward (upward in FIG. 1) and guides the front end portion of the rear wire 2 to the strip blade 7F. The clamp 6R swivels to rightward (downward in FIG. 1) to guide the rear end portion of the front wire 2 to the strip blade 7R. The strip blade 7F strips off the coating material at the front end portion of the wire 2 clamped by the clamp 6F, and a strip blade 7R strips off the coating material at the rear end portion of the wire 2 clamped by the clamp 6R.

The clamp 6F swings further leftward and guides the front end portion of the rear wire 2 to the terminal crimper 9F (see the virtual line in FIG. 1). The clamp 6R swings further rightward and guides the rear end portion of the front wire 2 to the terminal crimper 9R (see the virtual line in FIG. 1). Then, the terminal crimper 9F crimps the terminal 8 onto the front end portion of the wire 2 clamped by the clamp 6F. The terminal crimper 9R crimps the terminal 8 onto the rear end portion of the wire 2 clamped by the clamp 6R. As a result, the wire 2 clamped by clamp 6R becomes the wire 2 of a predetermined length with terminals 8 crimped at opposite ends. When clamp 6R releases its grasp, the wire 2 is collected in a tray (not shown). On the other hand, the clamp 6F swivels rightward (downward in FIG. 1) and returns to the position in front of the cutting blade 7a of the cutter device 7. Then, the clamp 6F releases its grasp on the wire 2. Thus, one cycle of operation ends.

The wire processing device 1 successively produces the wires 2 of a predetermined length with terminals 8 crimped at opposite ends by repeating the cycle operation described above. During operation of the wire processing device 1, the feeding device 5 successively dispenses the wire 2 from the reel 3 by repeating the operation of feeding the wire 2 and the operation of stopping the feed.

During operation of the wire processing device 1 (i.e., while the feeding device 5 is repeating the operation of feeding the wire 2 and the operation of stopping the feed), the wire 2 is dispensed in the order from the portion wound on the outer portion of the reel 3 to the portion wound on the inner portion. However, the portion wound on the inner portion of the reel 3 is more curved than the portion wound on the outer portion of the reel 3. Therefore, during operation of the wire processing device 1, the degree of the curl of the wire 2 supplied to the wire straightening device 20 is not constant and changes gradually.

The hardness of the wire 2 varies depending on environmental conditions such as temperature and humidity. For example, when the wire processing device 1 is operated twice without replacing the reel 3, some time may elapse between the first operation and the second operation. In such a case, the environmental conditions may change between the first operation and the second operation, and the hardness of the wire 2 may vary. After using a part of the wire 2 wound on the reel 3, the reel 3 may be replaced, and after elapse of a certain amount of time, the reel 3 may be reinstalled and the remaining wire 2 wound on the reel 3 may be used. In such a case, even if the wire 2 is wound on the same reel 3, the environmental conditions may change and the hardness of the wire 2 may vary. Even wires 2 of the same type may have different hardnesses depending on the condition of storage before use. However, if the hardness of the wire 2 varies, the desirable pressing force varies, and the desirable roller spacing varies.

Therefore, the roller spacing (preset value) that is uniformly set in advance in accordance with the outer diameter of the wire 2 is not always the desirable roller spacing. By setting a desirable roller spacing in advance in accordance with the outer diameter of the wire 2 and setting the roller spacing to the preset value before starting operation of the wire processing device 1, the curl of the wire 2 can be generally desirably straightened after the start of operation. However, if the roller spacing can be adjusted appropriately in accordance with the condition of the wire 2 during operation of the wire processing device 1, it is possible to further precisely straighten the curl of the wire 2.

In view of this, in the present embodiment, the operator adjusts the roller spacing by operating the change input device 50 while watching the condition of the wire 2 (e.g., the track of the wire 2) downstream of the wire straightening device 20 during operation of the wire processing device 1.

The operator presses the down button 52 of the change input device 50, for example, if the pressing force on the wire 2 is inferred to be small based on the condition of the wire 2. Then, the correction value setting section 35 sets a negative correction value, and the motor drive control section 36 controls the motor 26a to move the first support member 24 down one step. As a result, the roller spacing is reduced by one step and the pressing force that the wire 2 receives from the first straightening rollers 25 and the second straightening rollers 23 is increased by one step. Then, the number of lamps of the indicator 60 that are lit is reduced by one, and the operator can easily recognize that the roller spacing has been reduced by one step.

Conversely, if it is inferred from the condition of the wire 2 that the pressing force on the wire 2 is large, the operator presses the up button 51 of the change input device 50. Then, the correction value setting section 35 sets a positive correction value, and the motor drive control section 36 controls the motor 26a to move the first support member 24 up one step. As a result, the roller spacing is increased by one step and the pressing force that the wire 2 receives from the first straightening rollers 25 and the second straightening rollers 23 is reduced by one step. Then, the number of lamps of the indicator 60 that are lit increases by one, and the operator can easily recognize that the roller spacing has been increased by one step.

Figure 7:
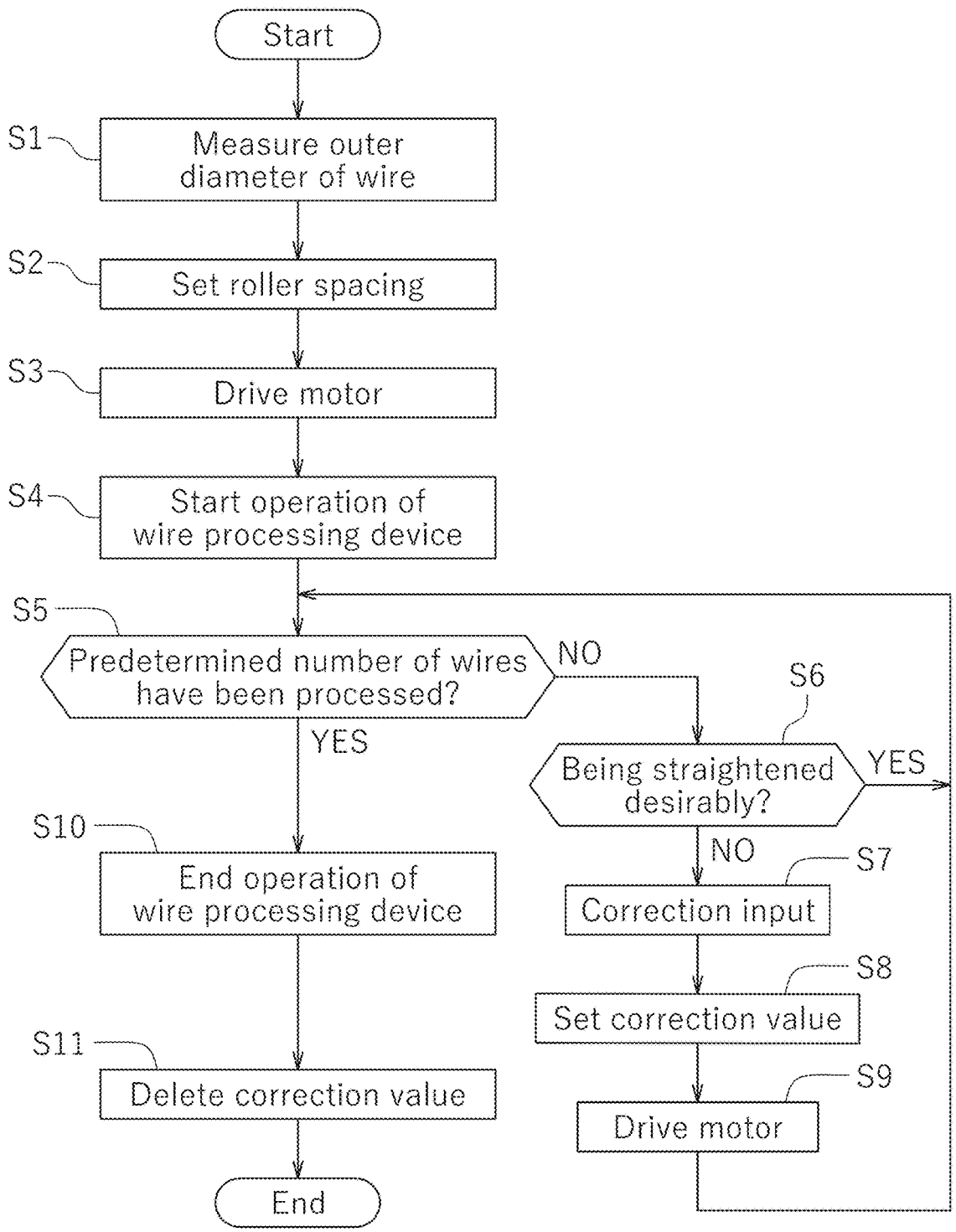
FIG. 7 is a flow chart showing a wire straightening method.

FIG. 7 is a flow chart of the wire straightening method using the wire straightening device 20. A wire straightening method according to the present embodiment will now be described with reference to FIG. 7. First, in step S1, the outer diameter of the wire 2 is measured by the outer diameter measuring section 40. Next, in step S2, the roller spacing is set by reading out, from the memory section 32, a preset value of the roller spacing in accordance with the outer diameter of the wire 2. Then, in step S3, the motor 26*a* is driven so that the roller spacing becomes equal to the preset value. This automatically sets the roller spacing to the preset value.

After the automatic setting of the roller spacing ends, the operation of the wire processing device 1 is started (step S4). That is, the operation of the feeding device 5, the cutter device 7 and the terminal crimpers 9F and 9R is started. In step S5, it is determined whether or not the processing of a predetermined number of wires 2 has been completed. In the present embodiment, the determination in step S5 is made by the control device 10. If the number of the wires 2 that have been processed is less than the predetermined number, the process proceeds to step S6.

In step S6, the operator visually checks the condition of the wire 2 to determine if the wire 2 is being straightened desirably. If the straightening is desirable, there is no need to change the roller spacing and the process returns to step S5. On the other hand, if it is determined by the operator that the straightening is not desirable, the operator makes a correction input by operating the change input device 50 (step S7). Specifically, the operator presses the up button 51 or the down button 52 of the change input device 50. Then, a correction value is set in accordance with the amount of operation by the operator (step S8), and the motor 26*a* is driven so that the roller spacing is changed by an amount in accordance with the correction value (step S9). When the roller spacing is changed, the process returns to step S5 to repeat the process of step S5 and subsequent steps.

When it is determined in step S5 that a predetermined number of wires have been processed, the operation of the wire processing device 1 is terminated (step S10). That is, the operation of the feeding device 5, the cutter device 7 and the terminal crimpers 9F and 9R is terminated. Thereafter, the correction value set in the correction value setting section 35 is erased (step S11), and the operation of the wire straightening device 20 is terminated.

As described above, according to the present embodiment, the roller spacing can be changed through operation by the operator during operation of the wire processing device 1. Therefore, after the roller spacing is automatically set to a preset value in accordance with the outer diameter of the wire 2, the roller spacing can be fine-tuned based on how the wire 2 is being straightened. Therefore, even if the desirable roller spacing varies due to changes in environmental conditions, etc., the wire 2 can be straightened at the desirable roller spacing. Therefore, according to the present embodiment, the curl of the wire 2 can be precisely corrected.

Now, during operation of the wire processing device 1, the feeding device 5 repeats the operation of feeding the wire 2 and the operation of stopping the feed. The motor drive control section 36, which receives a command from the correction value setting section 35, may drive the motor 26*a* when the wire 2 is being fed, but when the wire 2 is moving, a load is applied to the motor 26*a* through the first straightening rollers 25, the first support member 24 and the ball screw 26*b*. Therefore, smooth operation of the motor 26*a* may be hindered. In view of this, the correction value setting section 35 and the motor drive control section 36 may wait for the wire 2 to stop before driving the motor 26*a* if the operator operates the change input device 50 when the wire 2 is being fed. That is, the correction value setting section 35 and the motor drive control section 36 may be configured to change the roller spacing while the feeding device 5 stops feeding the wire 2. This allows the motor 26*a* to be driven smoothly and the roller spacing to be adjusted in a stable manner.

In the present embodiment, the same motor 26*a* is used for the actuator that automatically sets the roller spacing before operation of the wire processing device 1 and the actuator that changes the roller spacing based on the operation by the operator during operation of the wire processing device 1. Compared to the case where those actuators are provided separately, the number of actuators can be reduced, and the wire straightening device 20 can be made smaller and less expensive.

In the present embodiment, the wire straightening device 20 includes the change input device 50 that can be operated by the operator during operation of the wire processing device 1. By using this change input device 50, the operator can easily adjust the roller spacing while seeing the condition of the wire 2 during operation of the wire processing device 1.

In the present embodiment, the wire straightening device 20 also includes the indicator 60 that displays the degree of the correction value of the roller spacing during operation of the wire processing device 1. By seeing this indicator 60, the operator can easily grasp the amount of change in roller spacing during operation of the wire processing device 1.

Now, the correction value that is set during operation of the wire processing device 1 is merely a value that temporarily became optimal for that operation, and should be changed as necessary in accordance with subsequent changes in environmental conditions. According to the present embodiment, after the operation of the wire processing device 1 ends (step S10), the correction value setting section 35 deletes the correction value that is set during that operation (step S11). Therefore, before the start of the next operation of the wire processing device 1, the roller spacing is automatically set to the preset value stored in the memory section 32. Therefore, the next operation can be started with a roller spacing that is generally considered desirable (i.e., the preset value), and the wire 2 can be straightened more desirably from immediately after the start of operation. Since the deviation between the preset value and the optimal value of the roller spacing is normally small, the subsequent adjustment of the roller spacing can be performed quickly and smoothly. Note that the deletion of the correction value does not necessarily need to be performed immediately after the end of operation of the wire processing device 1, but may be performed before the start of the next operation. For example, in the flow chart of FIG. 7, step S11 may be performed before step S1.

However, the embodiment described above is merely an example, and the correction value does not necessarily have to be deleted. The controller 28 may be configured to retain the set correction value after the operation of the wire processing device 1 ends. For example, the controller 28 may store the correction value in a memory (not shown) after the operation of the wire processing device 1 ends. The stored correction value may, for example, be referred to by the operator as reference data for the next operation. Before the start of the next operation, the operator may be allowed to select between the preset value and a value that is obtained by adding a correction value to the preset value (i.e., the roller spacing at the end of the previous operation). Such as when environmental conditions have not changed much between the end of operation of the wire processing device 1 and the start of the next operation, the operator may wish to start the next operation with the roller spacing at the end of the previous operation. In such cases, the amount of time required to adjust the roller spacing can be reduced by selecting the value obtained by adding a correction value to the preset value.

Although the preset value is retained during operation of the wire processing device 1, it is possible to update the preset value after the end of operation. For example, when the operation of the wire processing device 1 ends, the controller 28 may overwrite the preset value stored in the memory section 32 and re-set the preset value to a value that is obtained by adding a correction value to the preset value.

In the present embodiment, the indicator 60 includes eight lamps 61 to 68 and is configured to display the degree of the correction value in eight levels. However, there is no particular limitation on the form of display of the indicator 60. The indicator 60 is not limited to an indicator that displays the degree of the correction value stepwise. The indicator 60 may be configured to display the correction value itself (i.e., a numerical value).

Second Embodiment

The wire straightening device 20 according to the first embodiment is configured to adjust the roller spacing by utilizing the motor 26a that automatically sets the roller spacing. However, the motor 26a for automatically setting the roller spacing and the actuator for adjusting the roller spacing may be separate. The wire straightening device 20 according to the second embodiment includes an actuator for adjusting the roller spacing separately from the motor 26a for setting the roller spacing.

Figure 8:
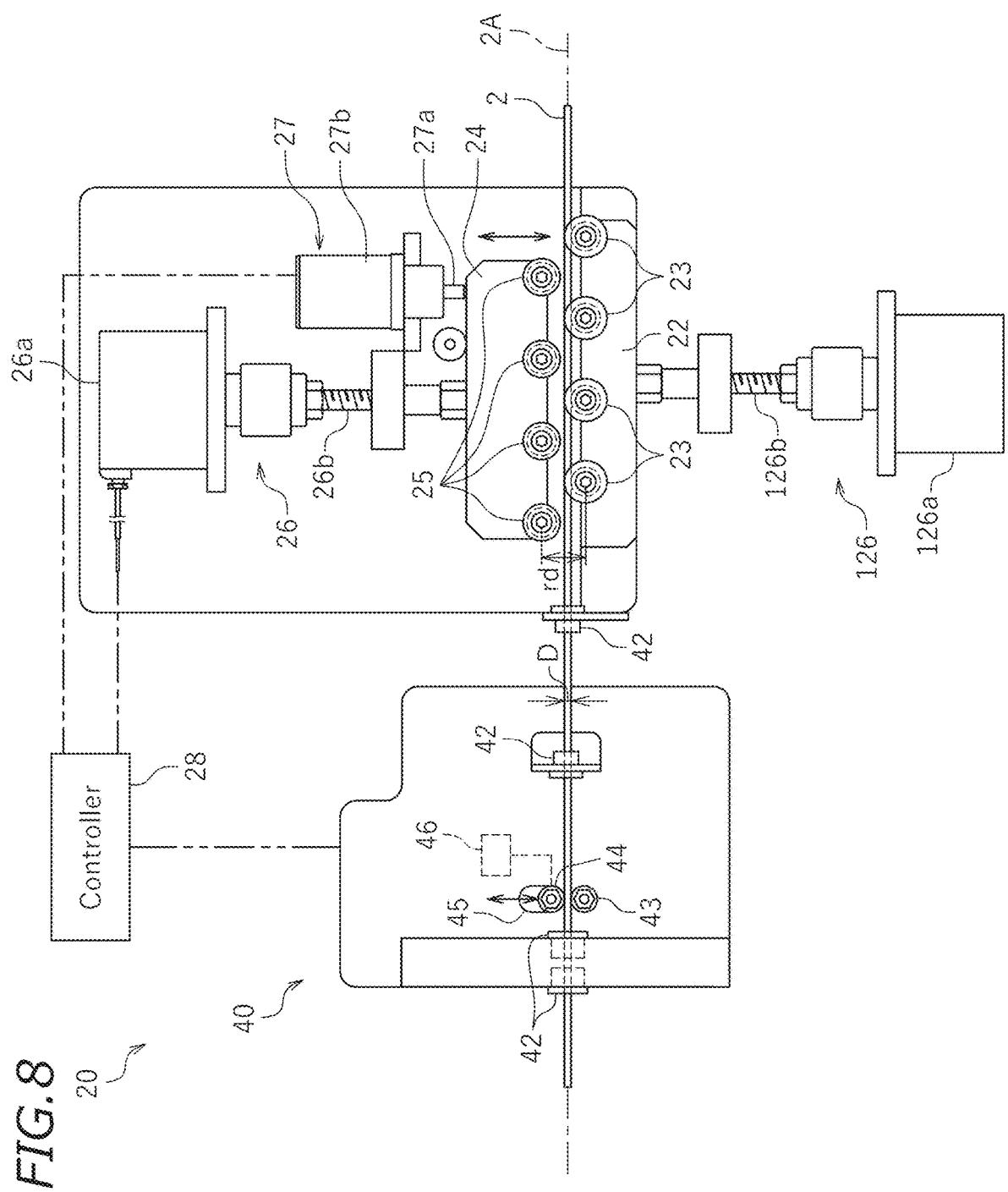
FIG. 8 is a side view showing a wire straightening device according to a second embodiment.

As shown in FIG. 8, the wire straightening device 20 according to the second embodiment includes a lift mechanism 126 that raises and lowers the second support member 22. The lift mechanism 126 includes a motor 126a and a ball screw 126b. The lower end portion of the ball screw 126b is linked to the motor 126a, and the upper end portion of the ball screw 126b engages with a female thread portion (not shown) of the second support member 22. When the motor 126a is driven, the ball screw 126b rotates and the second support member 22 rises or lowers. When the second support member 22 rises, the second straightening rollers 23 move closer to the first straightening rollers 25, and when the first support member 24 lowers, the second straightening rollers 23 move away from the first straightening rollers 25. The motor 26a is an example of another actuator for moving the second support member 22 in a direction such that the second straightening rollers 23 move closer to the first straightening rollers 25 and in a direction such that the second straightening rollers 23 move away from the first straightening rollers 25.

Figure 9:
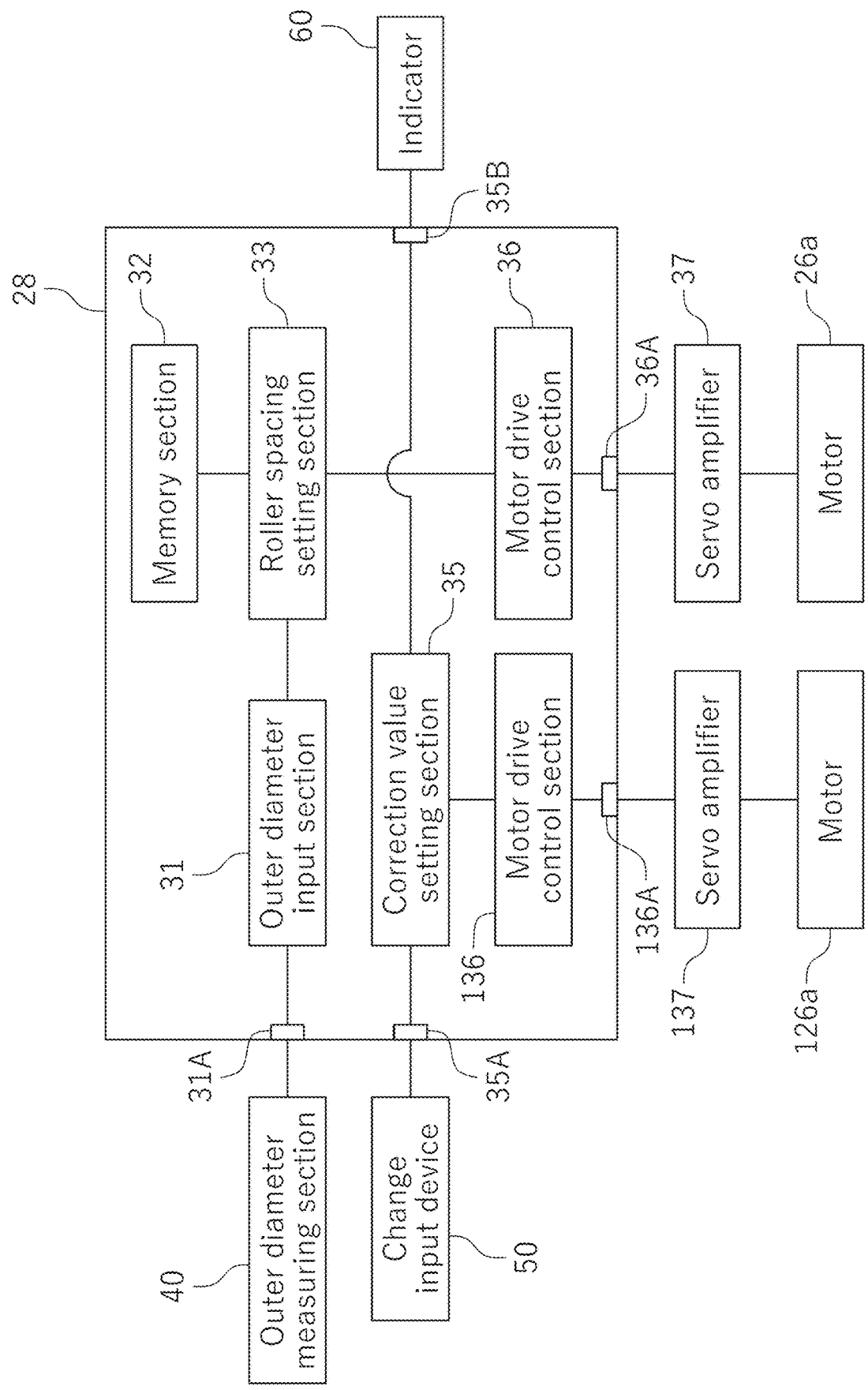
FIG. 9 is a block diagram showing a controller, etc., of the wire straightening device according to the second embodiment.

As shown in FIG. 9, in the second embodiment, the controller 28 is connected to motor 26a via the servo amplifier 37 and to the motor 126a via a servo amplifier 137. The controller 28 includes an output port 136A connected to the servo amplifier 137. The controller 28 also includes a motor drive control section 136 for controlling the motor 126a in addition to the motor drive control section 36 for controlling the motor 26a. The motor drive control section 136 controls the motor 126a based on the correction value that is set by the correction value setting section 35. In the present embodiment, the correction value setting section 35, the motor drive control section 136 and the motor 126a together form a "roller spacing changing device".

Otherwise, the configuration is similar to the first embodiment, and therefore the description will be omitted.

Also in the present embodiment, the outer diameter measuring section 40 measures the outer diameter of the wire 2, and the roller spacing setting section 33 reads, from the memory section 32, the preset value of the roller spacing in accordance with the outer diameter of the wire 2, and drives the motor 26a so that the roller spacing becomes equal to the preset value. As a result, the roller spacing is automatically set to the preset value before the start of operation of the wire processing device 1. On the other hand, when the operator operates the change input device 50, the correction value setting section 35 sets the correction value, and the motor drive control section 136 controls the motor 126a based on the correction value to change the roller spacing.

Also in the present embodiment, the operator can change the roller spacing in accordance with the condition of the wire 2 during operation of the wire processing device 1. Therefore, after the roller spacing is automatically set to a preset value in accordance with the outer diameter of the wire 2, the roller spacing can be adjusted during operation of the wire processing device 1 so that the wire 2 is corrected more appropriately.

Thus, it is possible to precisely straighten the curl of the wire 2.

The actuator for adjusting the roller spacing is not limited to the motor 126a. Although not shown in the figures, the actuator for adjusting the roller spacing may be a hydraulic cylinder such as an air cylinder, or any other type of an actuator.

Third Embodiment

The wire straightening device 20 according to the first embodiment and the second embodiment used an actuator to change the roller spacing. However, it is not always necessary to use an actuator to change the roller spacing. The wire straightening device 20 according to the third embodiment changes the roller spacing by a manual operation.

Figure 10:
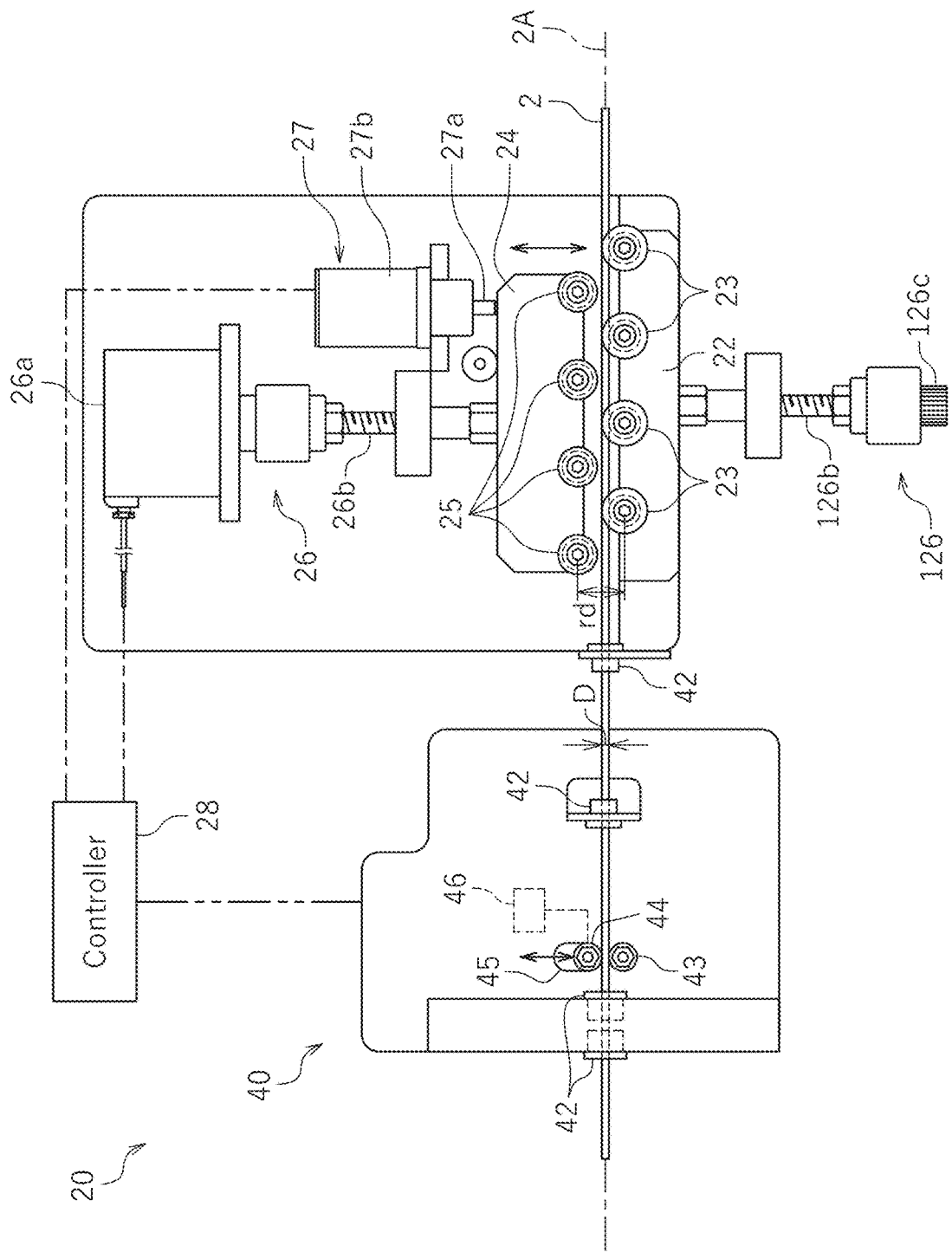
FIG. 10 is a side view showing a wire straightening device according to a third embodiment.

As shown in FIG. 10, the third embodiment includes a rotary knob 126c linked to the ball screw 126b instead of the motor 126a of the lift mechanism 126 of the wire straightening device 20 according to the second embodiment. In the third embodiment, unlike the second embodiment, the change input device 50 and the indicator 60 are absent. The controller 28 does not include the correction value setting section 35. In the present embodiment, the "roller spacing changing device" for changing the roller spacing is composed of the rotary knob 126c and the ball screw 126b.

When the rotary knob 126c is turned in one direction (e.g., clockwise as viewed from below), the second support member 22 rises and the second straightening rollers 23 move closer to the first straightening rollers 25. This reduces the roller spacing. When the rotary knob 126c is rotated in the opposite direction (e.g., counterclockwise as viewed from below), the second support member 22 lowers and the second straightening rollers 23 move away from the first straightening rollers 25. This increases the roller spacing. The ball screw 126b forms a "moving mechanism" that moves the second support member 22, by the operator manually operating the rotary knob 126c, in a direction such that the first straightening rollers 25 move closer to the second straightening rollers 23 and in a direction such that the first straightening rollers 25 move away from the second straightening rollers 23.

Otherwise, the configuration is similar to the second embodiment, and therefore the description will be omitted.

Also in the present embodiment, the outer diameter measuring section 40 measures the outer diameter of the wire 2, and the roller spacing setting section 33 reads, from the memory section 32, the preset value of the roller spacing in accordance with the outer diameter of the wire 2, and drives the motor 26a so that the roller spacing becomes equal to the preset value. The roller spacing is automatically set to the preset value before the start of operation of the wire processing device 1. On the other hand, in the present embodiment, the roller spacing is manually changed by the operator operating the rotary knob 126c during operation of the wire processing device 1.

In the present embodiment, the operator can also change the roller spacing during operation of the wire processing device 1. Therefore, after the roller spacing is automatically set to a preset value according to the outer diameter of the wire 2, the roller spacing can be adjusted according to the condition of the wire 2. Thus, it is possible to precisely straighten the curl of the wire 2.

Note that the rotary knob 126c is an example of an operator for manually operating the lift mechanism 126, but the operator is not limited to the rotary knob 126c. Operators of other forms may also be used.

While the indicator 60 is absent in the present embodiment, it is of course possible to provide the indicator 60. For example, a displacement sensor may be provided on the rotary knob 126c, and the displacement sensor and the indicator 60 may be connected to each other. In this case, the displacement sensor detects the amount of operation of the rotary knob and sends a signal regarding the amount of operation to the indicator 60. The indicator 60 receives the signal and displays the degree of the amount of operation. The indicator may also include an analog dial-type indicator (not shown), with which the display value changes in accordance with the amount of rotary operation of the rotary knob 126c.

Fourth Embodiment

Figure 11:
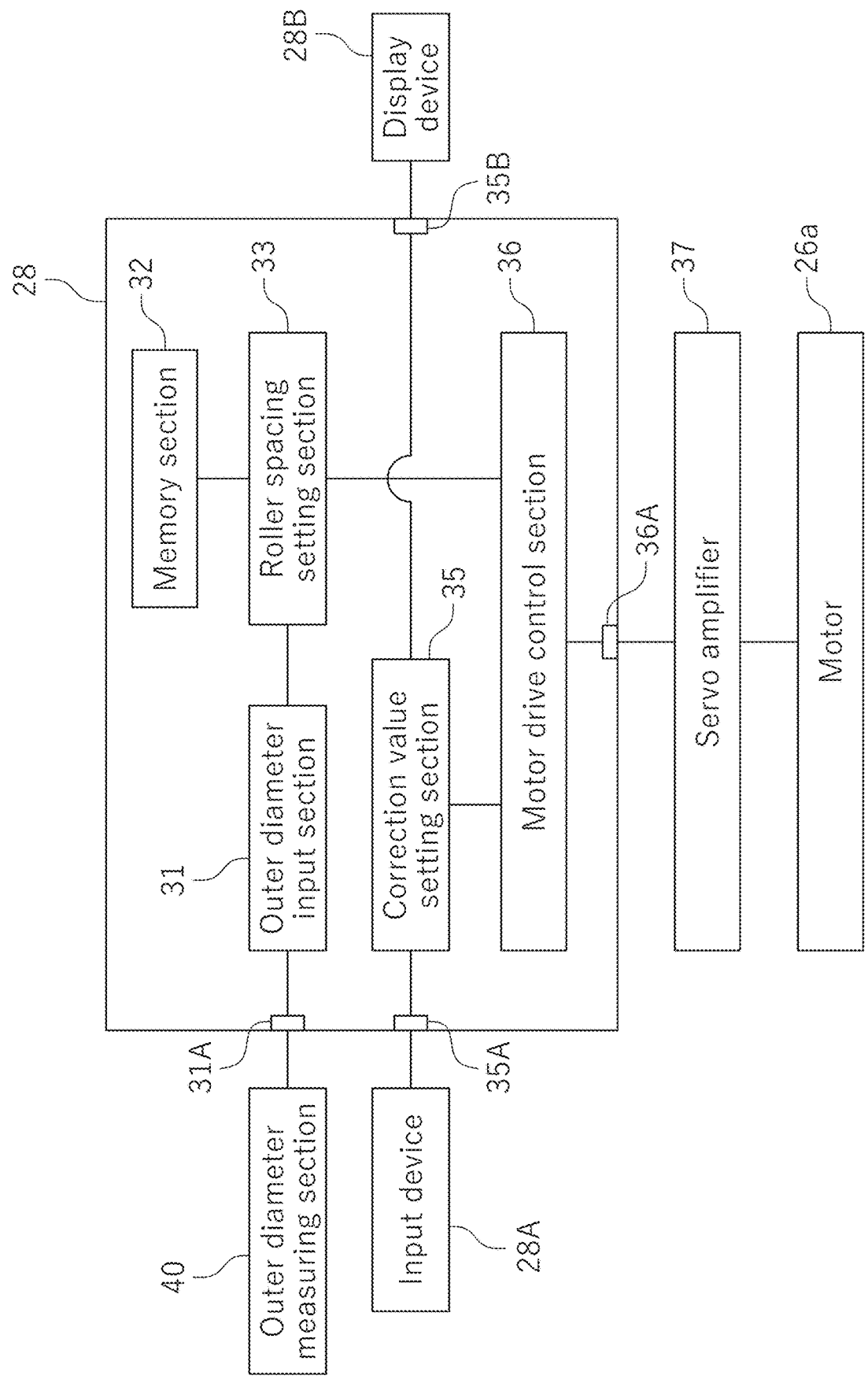
FIG. 11 is a block diagram showing a controller, etc., of a wire straightening device according to a fourth embodiment.

The wire straightening device 20 according to the first embodiment and the second embodiment includes the change input device 50 and the indicator 60, but an input device and a display device for computers may be used instead of the change input device 50 and the indicator 60, respectively. As shown in FIG. 11, the wire straightening device 20 according to the fourth embodiment uses an input device 28A and a display device 28B for computers instead of the change input device 50 and the indicator 60 of the first embodiment. Note that the input device 28A and the display device 28B for computers may be used instead of the change input device 50 and the indicator 60 of the second embodiment.

Figure 12:
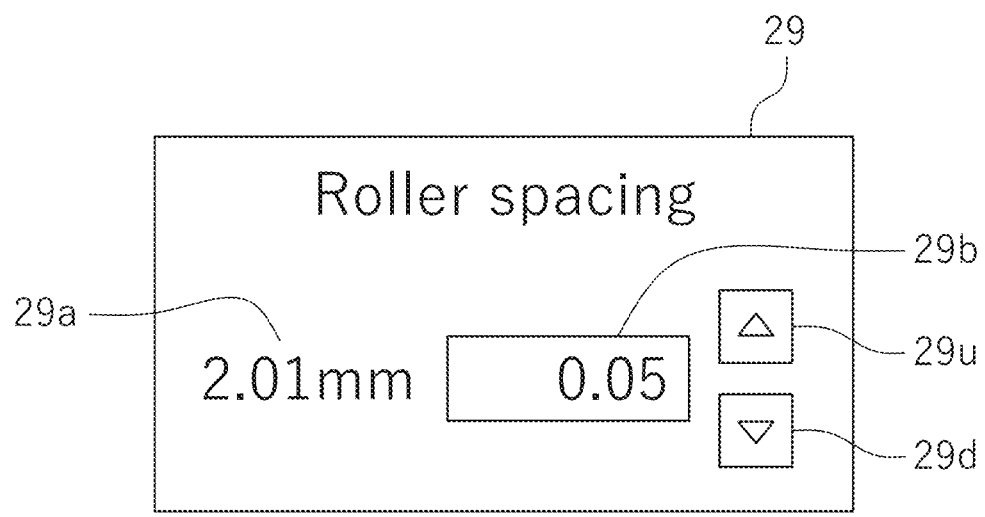
FIG. 12 is a view showing a roller spacing display image.

There is no particular limitation on the specific configuration of the input device 28A, and a keyboard, a mouse, a touch panel, or the like, may suitably be used, for example. There is no particular limitation on the specific configuration of the display device 28B, and a liquid crystal display, or the like, may suitably be used, for example. In the present embodiment, a part of the image displayed on the display device 28B includes a roller spacing display image 29 as shown in FIG. 12. This roller spacing display image 29 includes a preset value display section 29a that displays the preset value of the roller spacing and a correction value display section 29b that displays the correction value of the roller spacing. On the right side of the correction value display section 29b, an up button icon (hereinafter referred to simply as the "up button") 29u and a down button icon (hereinafter referred to simply as the "down button") 29d are displayed.

Otherwise, the configuration is similar to the first embodiment, and therefore the description will be omitted.

Also in the present embodiment, the outer diameter measuring section 40 measures the outer diameter of the wire 2, and the roller spacing setting section 33 reads, from the memory section 32, the preset value of the roller spacing in accordance with the outer diameter of the wire 2, and drives the motor 26a so that the roller spacing becomes equal to the preset value. The roller spacing is automatically set to the preset value before the start of operation of the wire processing device 1. The preset value of the roller spacing is displayed on the preset value display section 29a. In the example shown in FIG. 12, the preset value of the roller spacing is displayed as "2.01 mm".

The operator changes the roller spacing using the input device 28A while seeing the condition of the wire 2 during operation of wire processing device 1. For example, each time the operator clicks on the up button 29u of the roller spacing display image 29 using a mouse, the correction value of the roller spacing increases by one unit (herein, 0.01 mm), and each time the operator clicks on the down button 29d, the correction value of the roller spacing decreases by one unit. For example, in order to increase the roller spacing by 0.05 mm, the operator clicks on the up button 29u five times. For example, if the preset value is 2.01 mm and the correction value is 0.05 mm, the roller spacing is adjusted to 2.01 mm+0.05 mm=2.06 mm Note that the preset value is retained during operation of the wire processing device 1, and the value displayed on the preset value display section 29a remains unchanged. When the operator clicks the up button 29u or the down button 29d, the numerical value displayed in the correction value display section 29b changes, but the numerical value displayed in the preset value display section 29a remains unchanged.

In the present embodiment, the operator can still change the roller spacing during operation of the wire processing device 1. Therefore, after the roller spacing is automatically set to the preset value in accordance with the outer diameter of the wire 2, the roller spacing can be adjusted according to the condition of the wire 2. Thus, it is possible to precisely straighten the curl of the wire 2.

Also in the present embodiment, as in the first embodiment, the correction values may be erased after the end of operation of the wire processing device 1 or before the start of the next operation. The correction value may be retained after the end of operation of the wire processing device 1. The preset value may be updated so that the updated preset value is obtained by adding the correction value to the preset value.

While the embodiment described above is configured so that the operator inputs the correction value, the configuration may be such that the operator inputs the roller spacing instead of the correction value. For example, the example described above may be configured so that the operator inputs the roller spacing "2.06 mm", instead of inputting the correction value "0.05 mm". Note that even in such a case, the preset value "2.01 mm" is retained during operation of the wire processing device 1.

Fifth Embodiment

The controller 28 of the wire straightening device 20 of the embodiment described above includes the memory section 32 that stores the predetermined relationship between the outer diameter of the wire and the desirable roller spacing. The memory section 32 is an example of a "preset value obtaining device" for obtaining the preset value of the roller spacing predetermined for each type of wire. However, the preset value obtaining device is not limited to the memory section 32 provided in the controller 28. A memory section that stores the predetermined relationship between the outer diameter of the wire and the desirable roller spacing may be provided outside of the controller 28, and the controller 28 may include an obtaining section that obtains the roller spacing by communicating with the external memory section.

Figure 13:
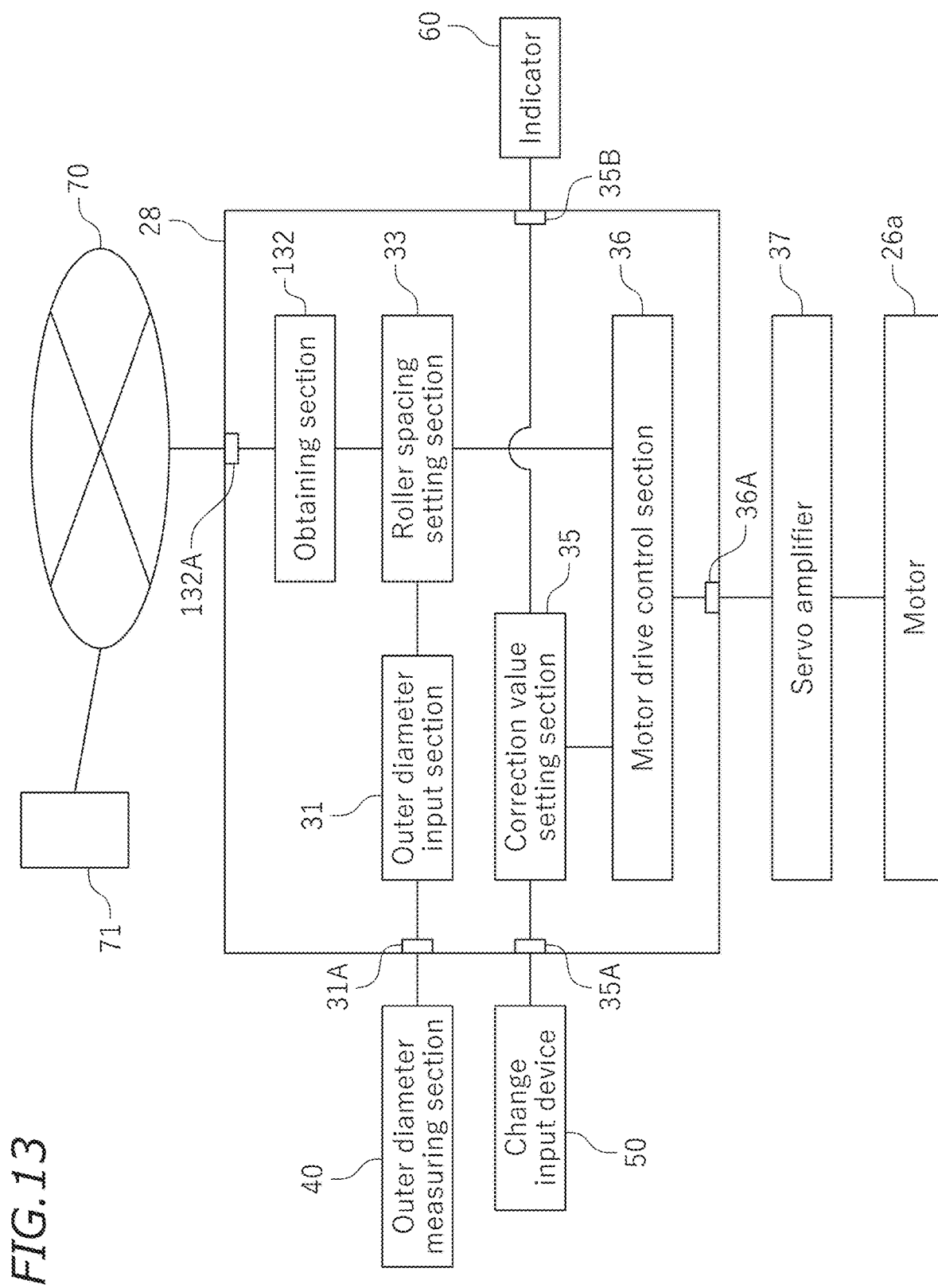
FIG. 13 is a block diagram showing a controller, etc., of a wire straightening device according to a fifth embodiment.

As shown in FIG. 13, the wire straightening device 20 of the fifth embodiment includes an obtaining section 132 connected to the Internet 70 via an input port 132A instead of the memory section 32 of the first embodiment. The obtaining section 132 is communicably connected through the Internet 70 to a server 71 which stores the predetermined relationship between the outer diameter of the wire and the desirable roller spacing. Otherwise, the configuration is similar to the first embodiment, and therefore the description will be omitted. In the present embodiment, the obtaining section 132 forms the "preset value obtaining device". Note that the server 71 may be a single server or may be formed by multiple servers connected by a network. The server 71 may be a so-called cloud server.

In the present embodiment, when the outer diameter of the wire 2 is input to the outer diameter input section 31, the obtaining section 132 reads the preset value of the roller spacing in accordance with the outer diameter of the wire 2 from the server 71 through the Internet 70. Then, the roller spacing setting section 33 obtains the preset value of the roller spacing from the obtaining section 132 and sends a command to the motor drive control section 36 so that the roller spacing becomes equal to the preset value. The motor drive control section 36 controls the motor 26*a* so that the roller spacing is set to the preset value. Thereafter, the roller spacing is adjusted in the same manner as in the first embodiment.

Also in the present embodiment, similar effects to those of the first embodiment can be obtained. According to the present embodiment, the preset value of the roller spacing can be changed as necessary by updating the information on the server 71. Even when a new type of wire is used, it is only needed to add the roller spacing information for that wire to the server 71. By simply adding or updating information stored in the server 71, the obtaining section 132 can obtain the preset value of the roller spacing desirable for the new type of wire.

Alternative Embodiment

While some embodiments of the present invention have been described above, these embodiments are merely examples. Various other embodiments are possible. Next, examples of alternative embodiments will be briefly described.

Figure 14:
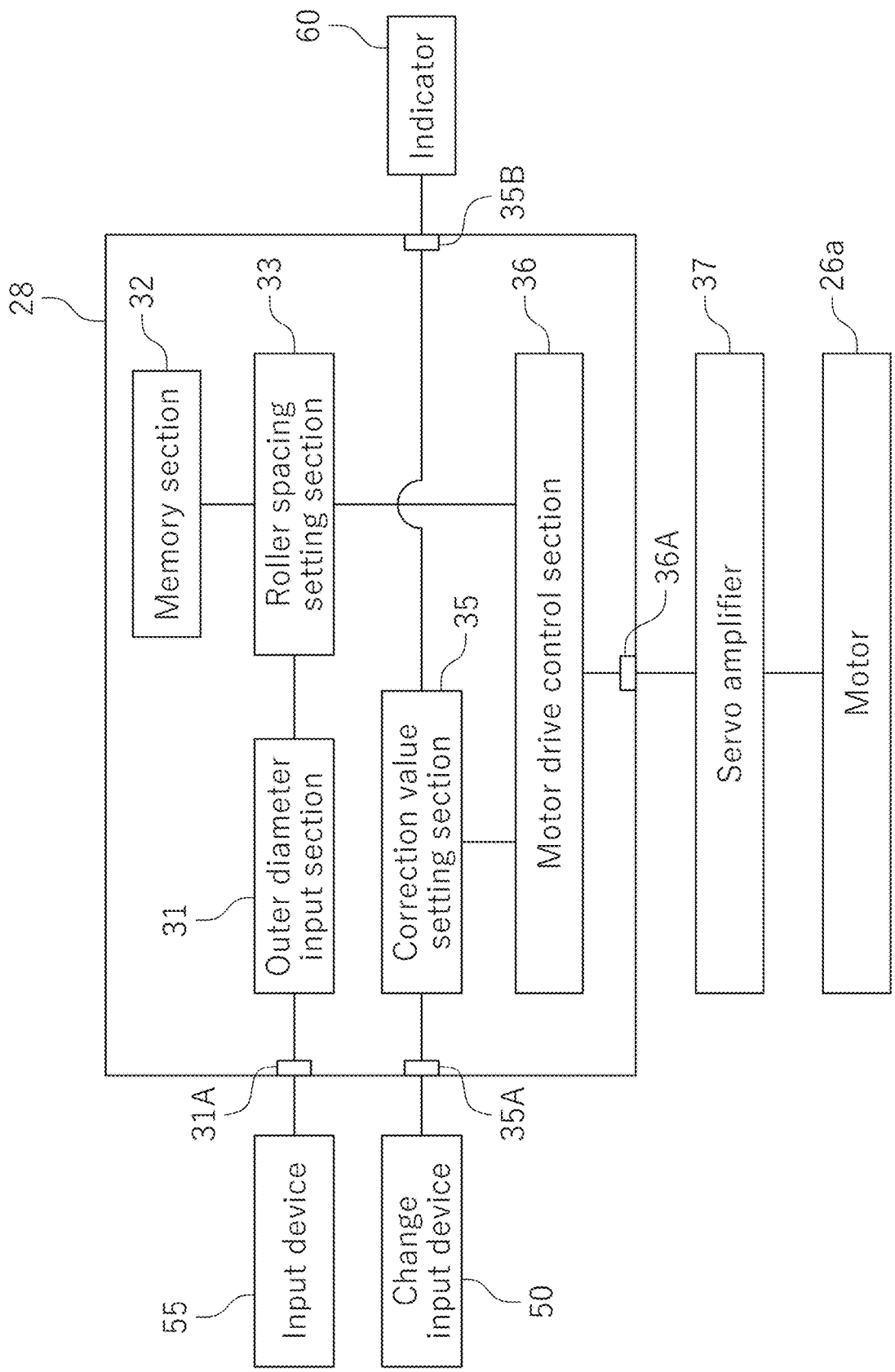
FIG. 14 is a block diagram showing a controller, etc., of a wire straightening device according to an alternative embodiment.

The wire straightening device 20 according to the embodiments described above includes the outer diameter measuring section 40 that measures the outer diameter of the wire 2. However, the outer diameter measuring section 40 is not always necessary. For example, the wire straightening device 20 may be configured so that the outer diameter of the wire 2 is input by an operator. For example, as shown in FIG. 14, the outer diameter input section 31 of the controller 28 may be connected to an input device 55 operated by the operator. Note that there is no particular limitation on the form of the input device 55, and the input device 55 may be a push button, a dial, a touch panel or a keyboard, for example. One or both of the input device 55 and the change input device 50 may be a portable terminal (e.g., a tablet PC, a smartphone) carried by the operator, etc. Note that the portable terminal may be communicably connected to the controller 28 via Bluetooth (registered trademark), or the like, or it may be communicably connected to the controller 28 via the Internet. The controller 28 may include another memory section (not shown) that stores the relationship between the wire 2 and the outer diameter of the wire 2, and may be configured so that when the operator inputs information that identifies the wire 2 (e.g., the product number) to the input device 55, the outer diameter input section 31 obtains the outer diameter in accordance with that wire 2.

While the preset value of the roller spacing is determined based on the outer diameter of the wire 2 in the embodiments described above, it may be determined based on the outer diameter and other information. For example, since the hardness of the wire 2 differs depending on the material of the coating material, the preset value of the roller spacing may be determined based on the outer diameter of the wire 2 and the material of the coating material. The specific method for setting the preset value of the roller spacing is not limited to this as long as the preset value of the roller spacing is set for each type of wire.

During operation of the wire processing device 1, the roller spacing is adjusted based on the condition of the wire 2, but there is no particular limitation on the method for checking the condition of the wire 2. The condition of the wire 2 may be visually checked directly by the operator. Alternatively, the condition of the wire 2 may be captured by a camera and the image captured by the camera may be displayed on a display. In this case, the operator can check the condition of the wire 2 by seeing the image on the display.

Figure 2:
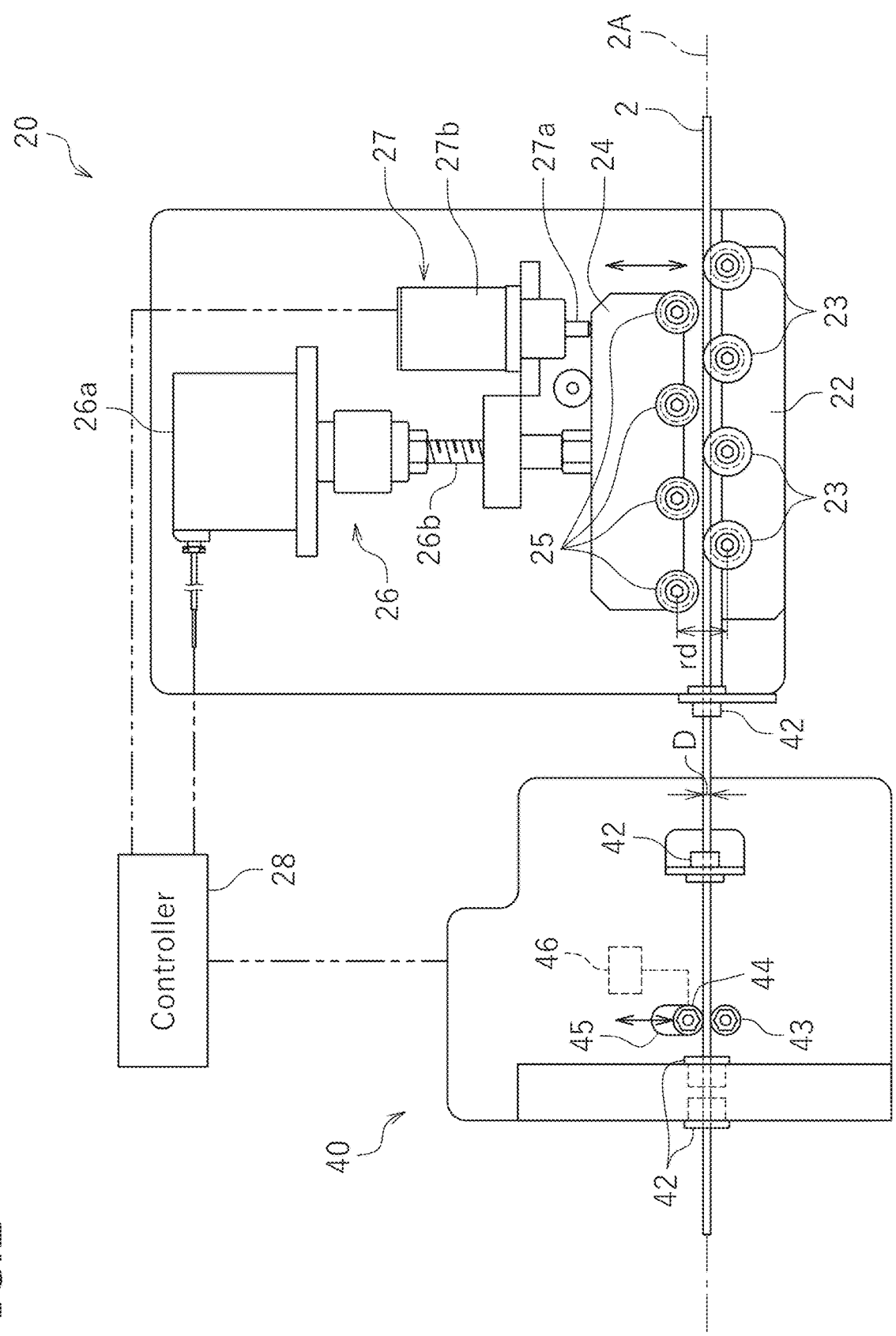
FIG. 2 is a side view showing a wire straightening device according to a first embodiment.

The wire straightening device 20 according to the embodiments described above includes the roller spacing measuring section 27 having the sensor body 27*b* and the detection pin 27*a* (see FIG. 2, etc.). However, there is no particular limitation on the specific configuration of the roller spacing measuring section as long as the roller spacing measuring section is capable of measuring the roller spacing. The roller spacing measuring section may be configured to detect the rotational position of the motor 26*a* based on the encoder value of the motor 26*a*, which is a servo motor, so as to obtain the roller spacing based on the rotational position.

In the embodiments described above, the motor 26*a* is configured to move only the first support member 24, between the first support member 24 and the second support member 22. However, the motor 26*a* may be configured to move both of the first support member 24 and the second support member 22.

The embodiments described above may be combined as appropriate. For example, in the first embodiment, the input device 28A of the fourth embodiment may be used instead of the change input device 50. The obtaining section 132 of the fifth embodiment may be applied to the second to fourth embodiments.

The process performed by the wire processing device 1 is not limited to cutting the wire 2, stripping off the coating material, and crimping terminals onto the wire 2. The wire processing device 1 may also perform other processes. The wire processing device 1 may be a device that performs at least one of cutting the wire 2, stripping off the coating material of the wire 2, and crimping terminals onto wires 2, or it may be a device that performs other processes. There is no particular limitation on the processes performed by the wire processing device 1.

REFERENCE SIGNS LIST

1 Wire processing device
2 Wire
2A Feed path
20 Wire straightening device
22 Second support member
23 Second straightening roller
24 First support member
25 First straightening roller
26a Motor (actuator)
28 Controller (computer)
32 Memory section (preset value obtaining device)
35 Correction value setting section
36 Motor drive control section (drive control section)

The invention claimed is:

1. A wire straightening device, included in a wire processing device, for straightening a curl of a wire that is fed onto a straight feed path, the wire straightening device comprising:
   a plurality of first straightening rollers arranged along the feed path;
   a plurality of second straightening rollers arranged along the feed path and arranged on an opposite side of the feed path from the first straightening rollers;
   a first support member that supports the first straightening rollers;
   a second support member that supports the second straightening rollers;
   an actuator that moves the first support member in a direction such that the first straightening rollers move closer to the second straightening rollers and in a direction such that the first straightening rollers move away from the second straightening rollers;
   a preset value obtaining device configured to obtain a preset value of roller spacing, representing an initial spacing between the first straightening rollers and the second straightening rollers before operation of the wire processing device, which is predetermined for each type of wire;
   a roller spacing automatic setting device configured to drive the actuator so that the roller spacing becomes equal to the preset value in accordance with the type of the wire, when the type of the wire is input; and
   a roller spacing changing device configured to change the roller spacing based on an operation by an operator while retaining the preset value during operation of the wire processing device; wherein
   the roller spacing changing device includes a computer including a correction value setting section configured to set a correction value of the roller spacing based on an operation by the operator, and a drive control section configured to drive the actuator so that the roller spacing becomes equal to a value that is obtained by adding the correction value to the preset value.

2. The wire straightening device according to claim 1, wherein the correction value setting section of the roller spacing changing device is configured to delete the set correction value after the operation of the wire processing device ends or before start of a next operation.

3. The wire straightening device according to claim 1, wherein the correction value setting section of the roller spacing changing device is configured to retain the set correction value even when the operation of the wire processing device ends.

4. The wire straightening device according to claim 1, comprising a display device that displays the preset value and the correction value.

5. The wire straightening device according to claim 1, wherein the roller spacing changing device includes a change input device configured so that the change input device can be operated by the operator during operation of the wire processing device so as to input a change to the roller spacing.

6. The wire straightening device according to claim 1, comprising an indicator that displays a degree of the correction value during operation of the wire processing device.

7. The wire straightening device according to claim 1, wherein the roller spacing changing device includes a moving mechanism that moves, by a manual operation by the operator, the second support member in a direction such that the second straightening rollers move closer to the first straightening rollers and in a direction such that the second straightening rollers move away from the first straightening rollers.

8. A wire processing device comprising:
   the wire straightening device according to claim 1;
   a feeding device that repeats an operation of feeding the wire onto the feed path and an operation of stopping the feed; wherein
   the roller spacing changing device is configured to drive the actuator so that the roller spacing becomes equal to a value that is obtained by adding the correction value to the preset value while the feeding device stops feeding the wire.

9. A wire straightening device, included in a wire processing device, for straightening a curl of a wire that is fed onto a straight feed path, the wire straightening device comprising:
   a plurality of first straightening rollers arranged along the feed path;
   a plurality of second straightening rollers arranged along the feed path and arranged on an opposite side of the feed path from the first straightening rollers;
   a first support member that supports the first straightening rollers;
   a second support member that supports the second straightening rollers;
   an actuator that moves the first support member in a direction such that the first straightening rollers move closer to the second straightening rollers and in a direction such that the first straightening rollers move away from the second straightening rollers;
   a preset value obtaining device configured to obtain a preset value of roller spacing, representing an initial spacing between the first straightening rollers and the second straightening rollers before operation of the wire processing device, which is predetermined for each type of wire;
   a roller spacing automatic setting device configured to drive the actuator so that the roller spacing becomes equal to the preset value in accordance with the type of the wire, when the type of the wire is input; and
   a roller spacing changing device configured to change the roller spacing based on an operation by an operator while retaining the preset value during operation of the wire processing device; wherein the roller spacing changing device includes:

another actuator that moves the second support member in a direction such that the second straightening rollers move closer to the first straightening rollers and in a direction such that the second straightening rollers move away from the first straightening rollers; and a computer including a correction value setting section configured to set a correction value of the roller spacing based on an operation by the operator, and a drive control section configured to drive the other actuator so that the roller spacing becomes equal to a value that is obtained by adding the correction value to the preset value.

10. A wire processing device comprising:

the wire straightening device according to claim 9;

a feeding device that repeats an operation of feeding the wire onto the feed path and an operation of stopping the feed; wherein the roller spacing changing device is configured to drive the other actuator so that the roller spacing becomes equal to a value that is obtained by adding the correction value to the preset value while the feeding device stops feeding the wire.

11. A wire processing device comprising:

a feeding device that repeats an operation of feeding a wire onto a feed path and an operation of stopping the feed;

a wire straightening device that straightens a curl of the wire that is fed onto the feed path; and a processing mechanism that performs at least one of cutting the wire that has been straightened by the wire straightening device, stripping off a coating material of the wire, and crimping a terminal onto the wire, wherein the wire straightening device includes:

a plurality of first straightening rollers arranged along the feed path;

a plurality of second straightening rollers arranged along the feed path and arranged on an opposite side of the feed path from the first straightening rollers;

a first support member that supports the first straightening rollers;

a second support member that supports the second straightening rollers;

an actuator that moves the first support member in a direction such that the first straightening rollers move closer to the second straightening rollers and in a direction such that the first straightening rollers move away from the second straightening roller;

a preset value obtaining device configured to obtain a preset value of roller spacing, representing an initial spacing between the first straightening rollers and the second straightening rollers before operation of the wire processing device, which is predetermined for each type of wire;

a roller spacing automatic setting device configured to drive the actuator so that the roller spacing becomes equal to the preset value in accordance with the type of the wire, when the type of the wire is input; and a roller spacing changing device configured to change the roller spacing based on an operation by an operator while retaining the preset value during operation of the wire processing device; wherein the roller spacing changing device includes a computer including a correction value setting section configured to set a correction value of the roller spacing based on an operation by the operator, and a drive control section configured to drive the actuator so that the roller spacing becomes equal to a value that is obtained by adding the correction value to the preset value.

12. A wire straightening method for straightening a wire by a wire straightening device provided in a wire processing device, the wire straightening device comprising:

a plurality of first straightening rollers arranged along a feed path;

a plurality of second straightening rollers arranged along the feed path and arranged on an opposite side of the feed path from the first straightening rollers;

a first support member that supports the first straightening rollers;

a second support member that supports the second straightening rollers;

an actuator that moves the first support member in a direction such that the first straightening rollers move closer to the second straightening rollers and in a direction such that the first straightening rollers move away from the second straightening roller; and a preset value obtaining device configured to obtain a preset value of roller spacing, representing an initial spacing between the first straightening rollers and the second straightening rollers before operation of the wire processing device, which is predetermined for each type of wire, the method comprising:

driving the actuator so that the roller spacing becomes equal to a preset value obtained by the preset value obtaining device in accordance with a type of the wire before start of operation of the wire processing device;

changing the roller spacing while retaining the preset value during operation of the wire processing device; and setting a correction value of the roller spacing based on an operation by an operator, and further driving the actuator so that the roller spacing becomes equal to a value that is obtained by adding the correction value to the preset value.

* * * * *